(12) United States Patent
Tran et al.

(10) Patent No.: US 11,561,713 B2
(45) Date of Patent: Jan. 24, 2023

(54) SIMPLIFIED HIGH CAPACITY DIE AND BLOCK MANAGEMENT

(71) Applicant: Western Digital Technologies, Inc., San Jose, CA (US)

(72) Inventors: Hiep Tran, Milpitas, CA (US); Dhayanithi Rajendiran, Milpitas, CA (US); Christopher Dinh, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 77 days.

(21) Appl. No.: 17/199,135

(22) Filed: Mar. 11, 2021

(65) Prior Publication Data

US 2022/0291836 A1 Sep. 15, 2022

(51) Int. Cl.
*G06F 3/06* (2006.01)
*G06F 12/1045* (2016.01)

(52) U.S. Cl.
CPC ............ *G06F 3/064* (2013.01); *G06F 3/0604* (2013.01); *G06F 3/0673* (2013.01); *G06F 12/1054* (2013.01); *G06F 2212/251* (2013.01)

(58) Field of Classification Search
CPC ...... G06F 3/064; G06F 3/0604; G06F 3/0673; G06F 12/1054; G06F 2212/251
See application file for complete search history.

(56) References Cited

U.S. PATENT DOCUMENTS

| | | | |
|---|---|---|---|
| 9,323,662 B2 | 4/2016 | Gavens | |
| 9,442,662 B2 | 9/2016 | Dancho et al. | |
| 9,626,312 B2 | 4/2017 | Frid et al. | |
| 9,983,829 B2 | 5/2018 | Ravimohan et al. | |
| 9,990,304 B2 * | 6/2018 | Tomlin | G06F 3/061 |
| 10,073,627 B2 | 9/2018 | Ravimohan et al. | |
| 11,294,594 B2 * | 4/2022 | Wells | G06F 3/0644 |
| 2013/0013852 A1 * | 1/2013 | Hou | G06F 12/0246 711/E12.008 |
| 2014/0173178 A1 * | 6/2014 | Schwartz | G06F 12/0246 711/103 |
| 2016/0170642 A1 * | 6/2016 | Miyamoto | G06F 3/0655 711/103 |
| 2017/0199703 A1 * | 7/2017 | Ravimohan | G06F 3/064 |

(Continued)

*Primary Examiner* — Andrew J Cheong
(74) *Attorney, Agent, or Firm* — ArentFox Schiff LLP

(57) ABSTRACT

Aspects of a storage device including a memory and a controller are provided which simplify controller management of logical and physical meta-dies and meta-blocks by allowing a logical meta-die to be mapped to multiple physical meta-dies. The memory includes first dies grouped in a first physical meta-die and second dies grouped in a second physical meta-die. The physical meta-dies each include physical meta-blocks. The controller maps a logical meta-die to the first physical meta-die and the second physical meta-die. The controller may also map logical meta-blocks of the logical meta-die to the physical meta-blocks. For instance, the controller may associate a first logical meta-block of the logical meta-die to the first physical meta-die and a second logical metablock of the logical meta-die to the second physical meta-die. As a result, firmware complexity in managing meta-dies and meta-blocks may be reduced compared to one-to-one logical-to-physical meta-die mapping approaches.

20 Claims, 17 Drawing Sheets

(56) References Cited

U.S. PATENT DOCUMENTS

| | | | |
|---|---|---|---|
| 2017/0286286 A1* | 10/2017 | Szubbocsev | G06F 12/0246 |
| 2018/0247948 A1* | 8/2018 | Kanno | H01L 27/11524 |
| 2019/0129841 A1* | 5/2019 | Kanno | G06F 3/0614 |
| 2021/0303424 A1* | 9/2021 | Jain | G06F 3/0679 |
| 2022/0129378 A1* | 4/2022 | McJilton | G06F 12/0276 |

* cited by examiner

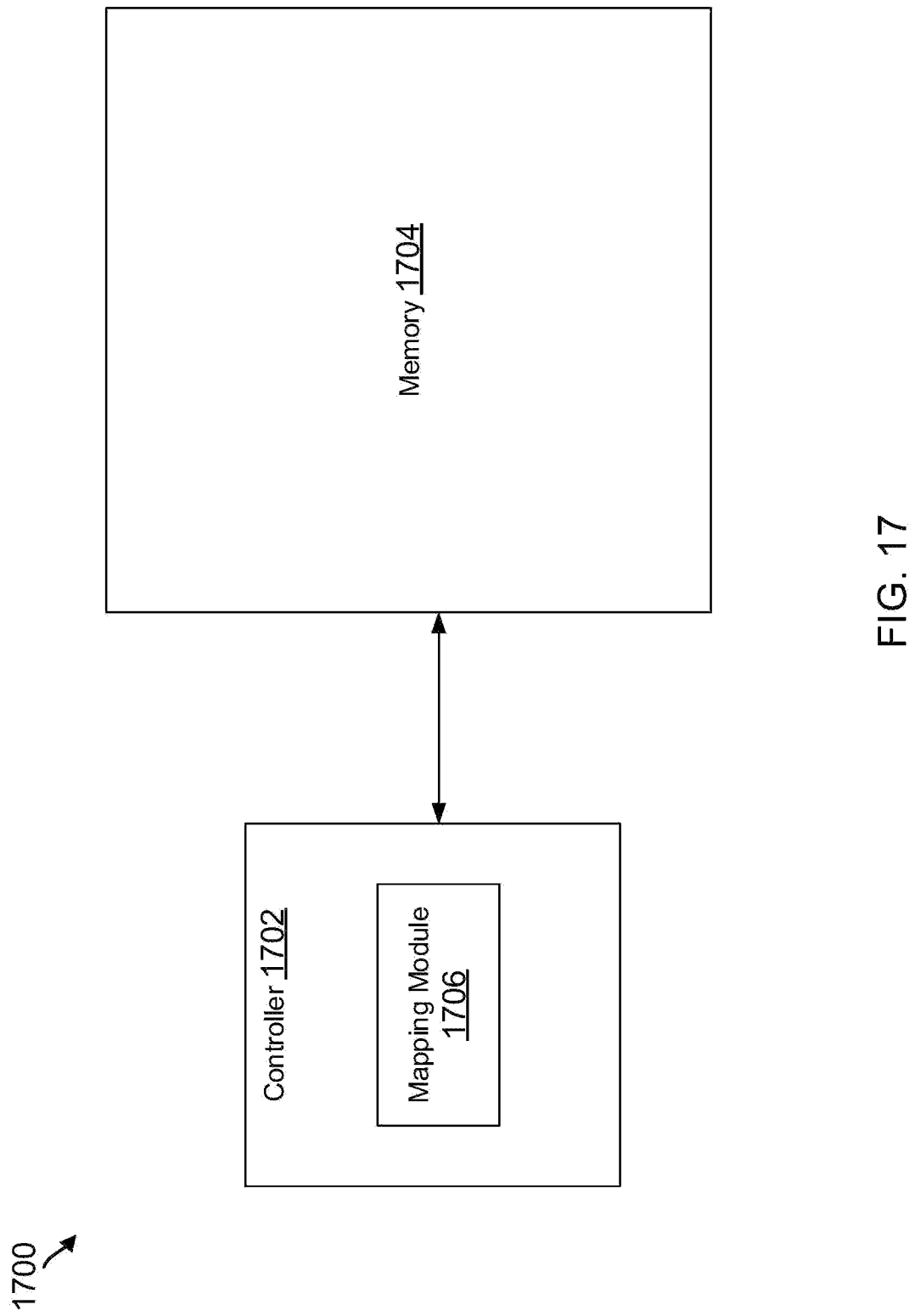

SIMPLIFIED HIGH CAPACITY DIE AND BLOCK MANAGEMENT

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

Flash storage devices may include many blocks of flash memory that store data. Numerous blocks may be contained within a die, and flash storage devices may include many dies. Moreover, flash storage devices may include multiple channels over which data may be carried to and from the dies. For example, a typical, high capacity flash storage device may include four or more channels, where each channel is coupled to one or more NAND packages or chips that each include multiple dies. As a result, flash storage devices may read or write data in multiple blocks or dies at the same time.

SUMMARY

One aspect of a storage device is disclosed herein. The storage device includes a memory and a controller. The memory includes a plurality of physical meta dies, where each physical meta die includes a plurality of dies, where each of the dies in a same one of the physical meta dies is coupled to a different channel, and where two or more of the dies in the same one of the physical meta dies include a different number of blocks. The controller is configured to map a logical meta die to the physical meta dies, where a total number of blocks in the dies coupled to one of the channels is the same as a total number of blocks in the dies coupled to another one of the channels.

Another aspect of a storage device is disclosed herein. The storage device includes a memory and a controller. The memory includes a plurality of physical meta dies each including a plurality of physical meta blocks. The controller is configured to map logical meta blocks of a logical meta die to the physical meta blocks, where one of the logical meta blocks is associated with blocks in two or more of the physical meta dies.

A further aspect of a storage device is disclosed herein. The storage device includes a memory and a controller. The memory includes a plurality of physical meta dies each having a plurality of dies, where each of the physical meta dies includes a plurality of physical meta blocks, and where each of the dies is coupled to a channel and includes a plurality of blocks. The controller is configured to map a logical meta die to the physical meta dies, and to map logical meta blocks of the logical meta die to the physical meta blocks, where a first one of the logical meta blocks is associated with one of the physical meta dies and a second one of the logical meta blocks is associated with two or more of the physical meta dies. The controller is also configured to identify the first one of the logical meta blocks from a first one of the blocks and the second one of the logical meta blocks from a second one of the blocks. It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein:

FIG. 17 is a conceptual diagram illustrating an example of a controller that maps a logical meta die to physical meta dies and logical meta blocks of the logical meta die to physical meta blocks of the physical meta dies in the storage device of FIG. 1.

DETAILED DESCRIPTION

Figure 1:
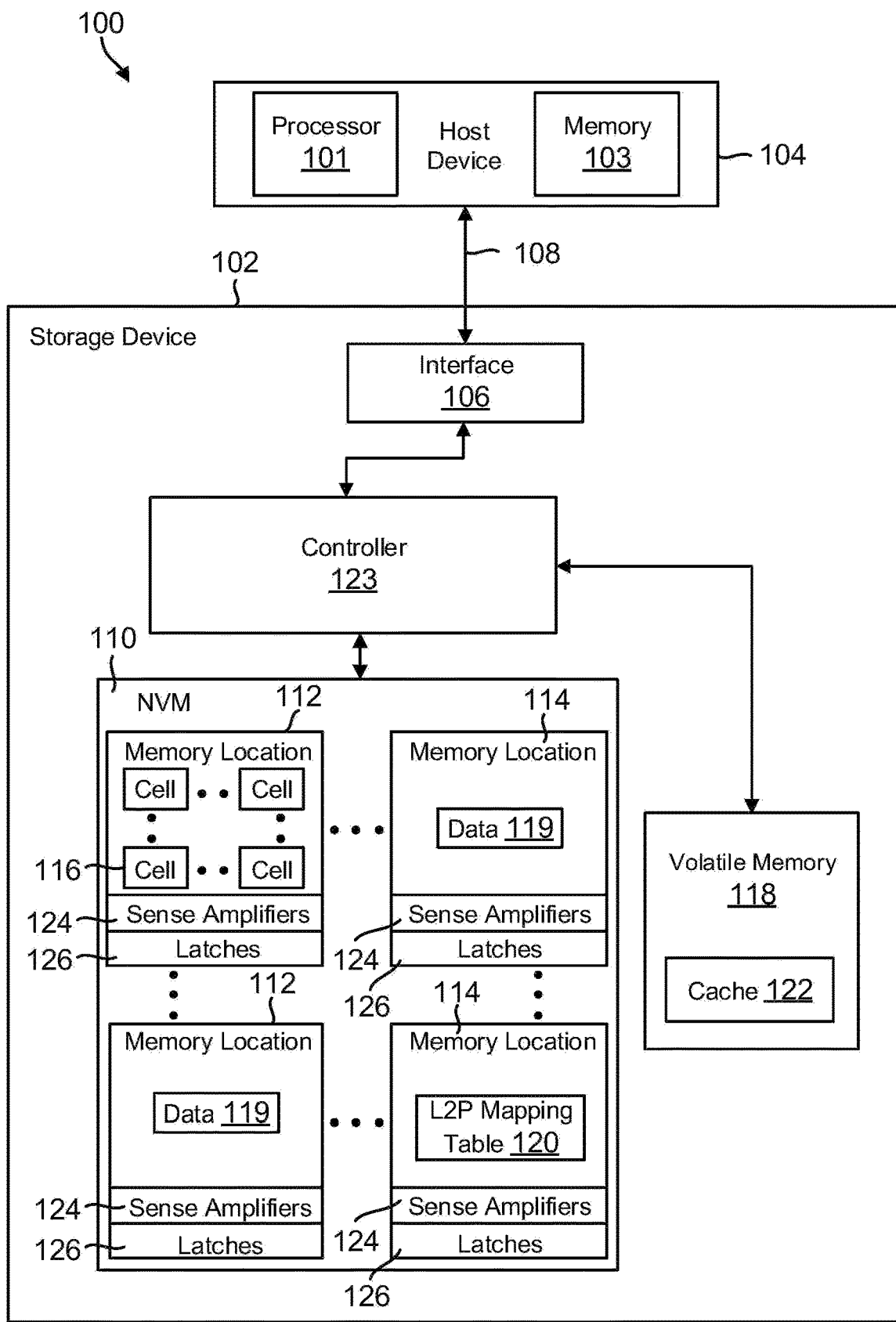
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

A flash storage device may include multiple channels that are each coupled to multiple dies, thus allowing multiple blocks of NAND memory to be read or written at the same time. When reading or writing host data to these blocks, the flash storage device may include firmware which performs logical-to-physical address translation. For example, the flash storage device may translate a host address associated with the data to a logical NAND address, convert the logical NAND address to a physical NAND address, and then read or write data in the block associated with the physical NAND address. This functionality may be implemented in multiple layers of firmware, including, for example, a flash translation layer (FTL) that performs the logical address translation and a physical storage (PS) layer that performs the physical address conversion.

The flash storage device may manage multiple dies for parallel reads and writes by logically grouping the dies into logical meta dies and by physically grouping the dies into physical meta dies. A logical meta die is a logical grouping of dies, and a physical meta die is a physical grouping of dies which may be read or written in parallel. For instance, a logical meta die may be indicated by a single address which is mapped to logical addresses associated with different dies, and a physical meta die may be indicated by a single address which is mapped to physical addresses associated with dies coupled to different channels. Similarly, the flash storage device may manage multiple blocks in various dies for parallel reads and writes by logically grouping the blocks into logical meta blocks and by physically grouping the blocks into physical meta blocks. A logical meta block is a logical grouping of blocks, and a physical meta block is a physical grouping of blocks which may be read or written in parallel. For instance, a logical meta block may be indicated by a single address which is mapped to logical addresses associated with different blocks, and a physical meta block may be indicated by a single address which is mapped to physical addresses associated with blocks in dies coupled to different channels.

Generally, a flash storage device may map a single logical meta die including logical meta blocks to a single physical meta die including physical meta blocks. For example, if a flash storage device includes multiple channels, the flash storage device may group a die on each channel together to form a physical meta die and associate these dies with a physical meta die address, since the flash storage device may transmit data to or receive data from these dies simultaneously over their respective channels. The flash storage device may also group these dies together to form a logical meta die associated with a logical meta die address, and map the logical meta die address to the physical meta die address by creating an entry in one or more mapping tables. Similarly, the flash storage device may group a block in each plane of a die on each channel together to form a physical meta block and associate these blocks with a physical meta block address, since the flash storage device may likewise transmit data to or receive data from these blocks simultaneously over their respective channels, dies, and planes. The flash storage device may also group these blocks together to form a logical meta block associated with a logical meta block address, and map the logical meta block address to the physical meta block address by creating an entry in the one or more mapping tables.

Furthermore, dies and blocks may be added to increase storage capacity of the flash storage device. For example, a NAND chip including multiple dies and numerous blocks may be added to one or more channels of the flash storage device to increase capacity and possibly allow for more simultaneous reads or writes. In such case, the flash storage device may group the added dies into new logical meta dies and physical meta dies, as well as group the added blocks into new logical meta blocks and physical meta blocks. Moreover, the flash storage device may map each new logical meta die (including the logical meta blocks) to each new physical meta die (including the physical meta blocks), respectively, such that any single logical meta die is mapped to any single physical meta die.

However, maintaining the one-to-one mapping of logical meta dies to physical meta dies in such case may result in added complexity to the firmware. For example, if a new NAND chip is added to multiple existing channels of the flash storage device, the flash storage device may typically group a die in each new NAND chip together to form a new logical meta die, associate that logical meta die with a new logical meta die address, group the dies together to also form a physical meta die, associate that physical meta die with a new physical meta die address, and map the new logical meta die address to the new physical meta die address by creating a new entry in one or more mapping tables. The flash storage device may also typically group a block in each plane of the die in each new NAND chip together to form a new logical meta block, associate that logical meta block with a new logical meta block address, group the blocks together to also form a physical meta block, associate that physical meta block with a new physical meta block address, and map the new physical meta block address to the new logical meta block address by creating a new entry in the one or more mapping tables. Such creation of new logical meta die (and block) addresses and mapping table entries may result in increased firmware complexity. Alternatively, if the flash storage device groups a die or block in each new NAND chip to an existing physical meta die or physical meta block (e.g., if the new NAND chips are added to new channels, or to avoid creating new physical meta dies and thus new logical meta dies), the flash storage device may perform additional exclusive-or (XOR) parity checks for error correction due to the increase in size of the physical meta die or physical meta block. This additional data protection in the event of read or write failure may further result in increased firmware complexity. Moreover, increasing the size of existing physical meta dies may result in significantly increased power consumption or be limited by thermal considerations.

Accordingly, to simplify management of added dies and blocks for increased storage capacity, the flash storage device may map logical meta dies to multiple physical meta dies according to a one-to-many mapping. For example, after grouping dies together to form a physical meta die and associating that physical meta die with a new physical meta die address as described above, the flash storage device may map the new physical meta die address to an existing logical meta die address in the mapping table. Moreover, after grouping blocks together to form a physical meta block and associating that physical meta block with a new physical meta block address as described above, the flash storage device may map the new physical meta block address to a new logical meta block address associated with the existing logical meta die address. Thus, the flash storage device may associate multiple physical meta dies with the same logical meta die, rather than creating a new logical meta die for each physical meta die. Similarly, the flash storage device may associate multiple physical meta blocks of different physical meta dies with logical meta blocks in the same logical meta die.

In this way, the one-to-many mapping of logical meta dies to physical meta dies may reduce firmware complexity as opposed to the one-to-one mapping described above. For example, such one-to-many mapping may allow the flash storage device to avoid creating new logical meta die addresses and mapping these addresses individually to respective physical meta die addresses. Moreover, such approach may allow the flash storage device to simplify its data protection scheme by maintaining the same number of XOR parity checks in new physical meta dies as in existing physical meta dies, since new dies may be grouped into new physical meta dies having the same size as existing physical meta dies rather than being added to (and increasing the size of) an existing physical meta die.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
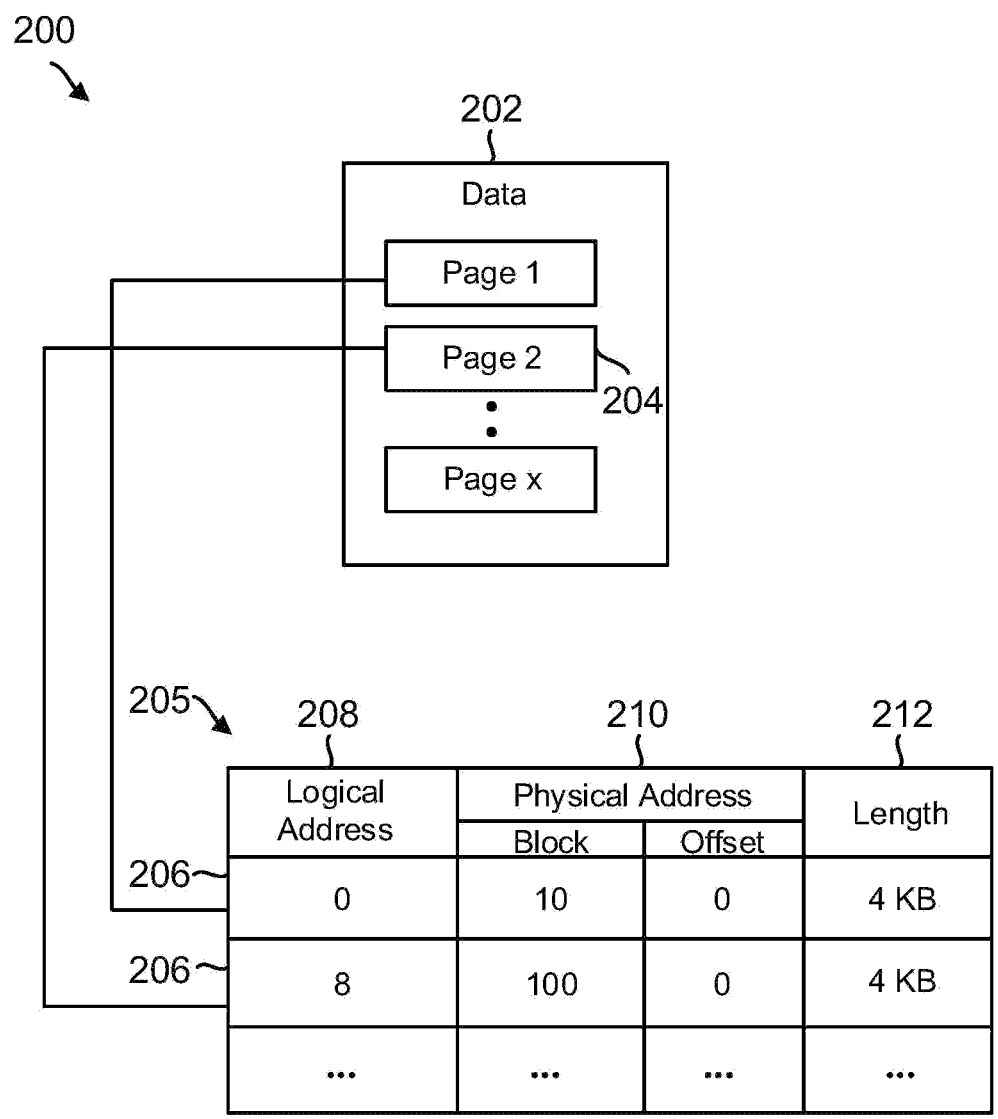
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
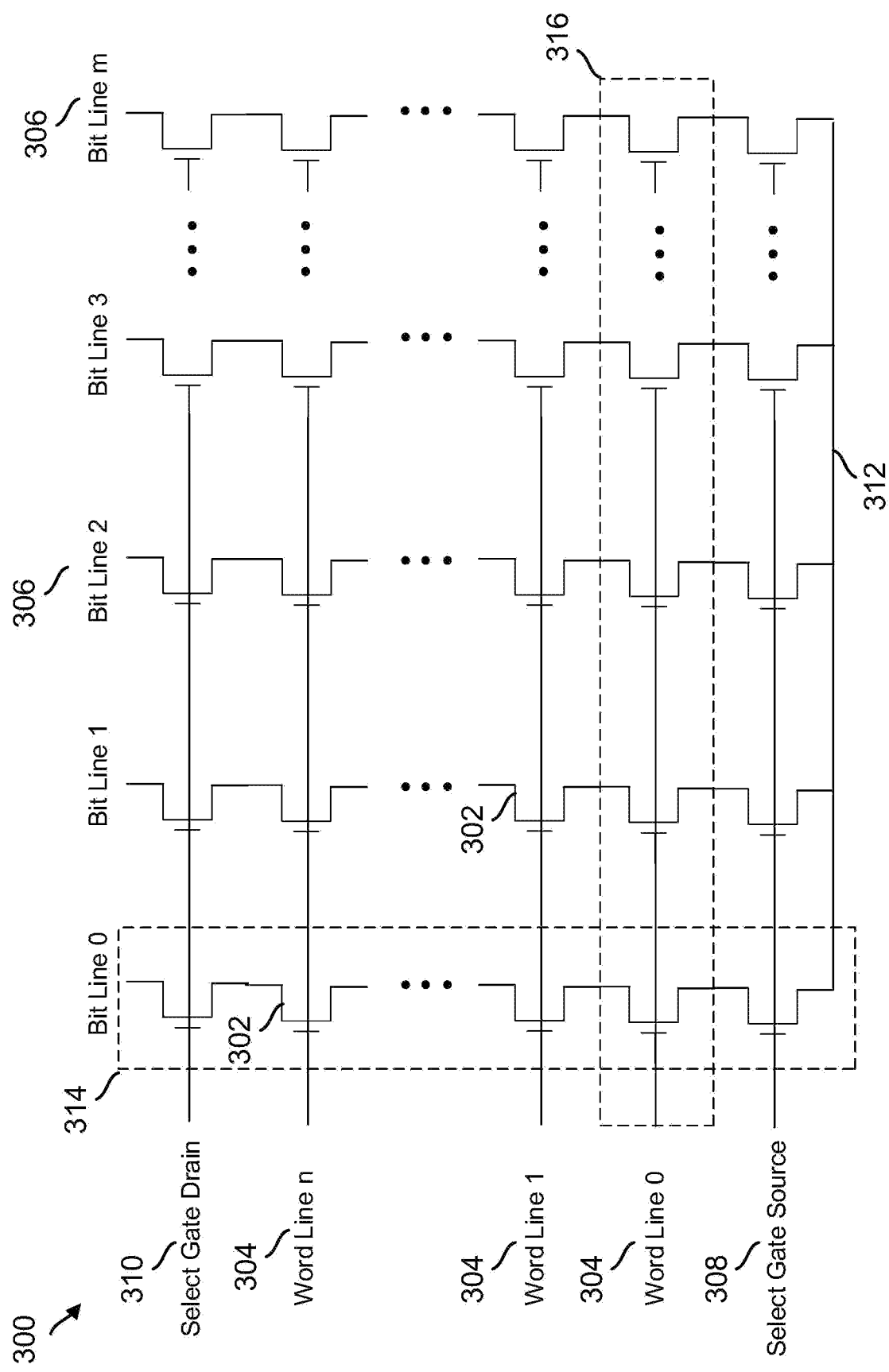
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-$n$ may each be associated with their own row address (e.g. word line 0 may correspond to word line address 0, word line 1 may correspond to word line address 1, etc.), and bit lines 0-$m$ may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
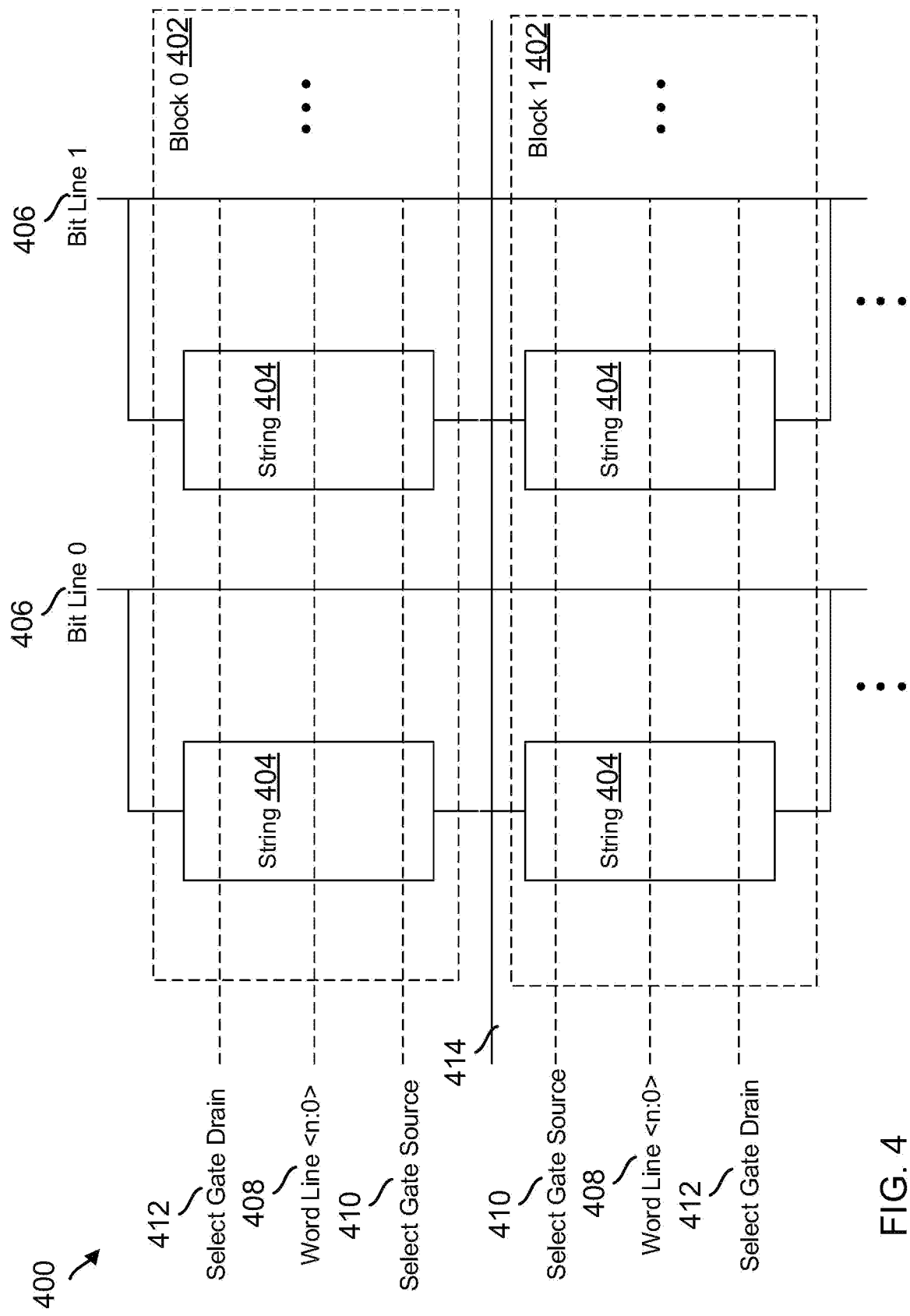
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 408 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 408 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 408 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 5:
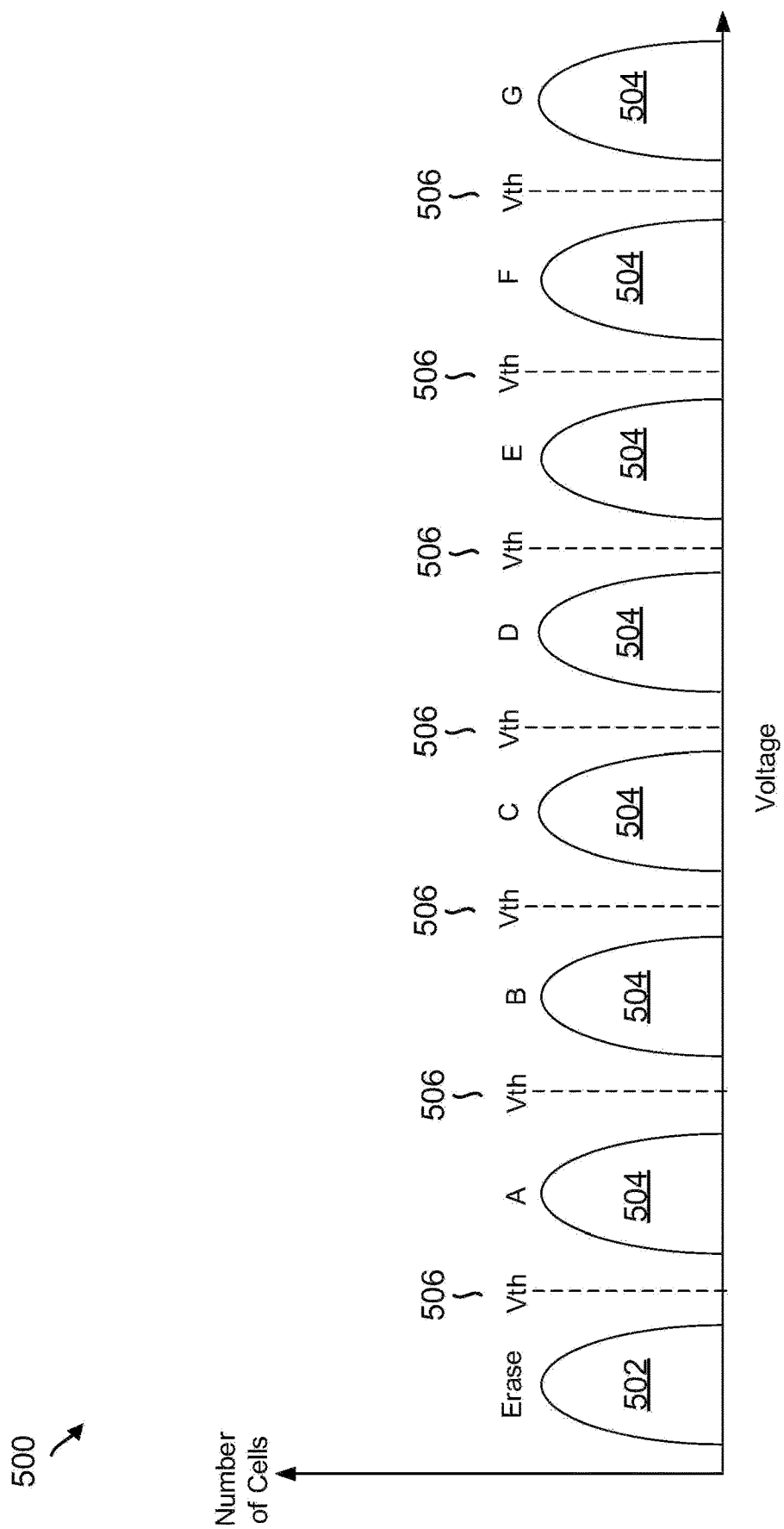
FIG. 5 is a graphical diagram illustrating an example of a voltage distribution chart for triple-level cells in the storage device of FIG. 1.

FIG. 5 illustrates an example of a voltage distribution chart 500 illustrating different NAND states for TLCs (e.g. cells 116, 302) storing three bits of data (e.g. logic 000, 001, etc. up to logic 111). The TLCs may include an erase state 502 corresponding to logic '111' and multiple program states 504 (e.g. A-G) corresponding to other logic values '000-110'. The program states 504 may be separated by different threshold voltages 506. Initially, the cells 116, 302 may be in the erase state 502, e.g. after the controller 123 erases a block 402 including the cells. When the controller 123 program LPs, MPs, and UPs as described above, the voltages of the cells 116, 302 may be increased until the threshold voltages 506 corresponding to the logic values to be stored are met, at which point the cells transition to their respective program states 504. While FIG. 5 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

When the controller 123 attempts to program cells 116, 302 of a selected word line 304, 408 into one of the program states 504, the controller may perform incremental step pulse programming (ISPP) over a number of programming loops or ISPP cycles. For example, a programming voltage (e.g. a high voltage) may be applied to the selected word line 304, 408, a pass through voltage (e.g. a high voltage lower than the programming voltage) may be applied to the other word lines 304, 408, a bit line program voltage (e.g. a low voltage) may be applied on the bit lines 306, 406 connected to the selected cells being programmed on the selected word line, and a bit line inhibit voltage (e.g. a high voltage) may be applied on the bit lines 306, 406 connected to the other cells not being programmed on the selected word line. Applying a high programming voltage to the selected word line and a low voltage to the selected bit lines allows electrons to tunnel from the channel into the charge trapping layer of those selected cells, thereby causing the threshold voltage of the cells to increase. On the other hand, applying a high voltage to unselected bit lines inhibits electrons from tunneling from the channel into the charge trapping layer of those unselected cells, thereby preventing the threshold voltage of those cells from increasing. Thus, bit lines coupled to cells programmed to lower states may be inhibited to prevent the threshold voltage of those cells from increasing while other cells are programmed to higher states. For instance, in the case of TLCs, the bit lines of cells that are first programmed into the A state may be inhibited first, followed by the bit lines of different cells that are programmed into the B state, followed by those that reach the C state, then the D state, and so forth until the remaining cells on the selected word line ultimately reach the G state and all cells on the selected word line have been programmed.

After the programming voltage is applied in one programming loop or ISPP cycle, a program verify voltage (e.g. a low voltage) may be applied to the word line 304, 408 to determine whether the threshold voltage of a cell has increased beyond a respective threshold voltage into an intended program state. If none of the cells have transitioned into an intended programming state, then another programming loop or ISPP cycle is performed in which a higher programming voltage may be applied to further increase the threshold voltage of the cells. Subsequently, a program verify voltage may again be applied to determine whether the threshold voltage of a cell has transitioned into an intended program state. The above process of incrementally increasing the programming voltage and verifying the voltage threshold of the selected cells may be repeated over a number of programming loops. If the cells transition into their respective programming states and the total number of programming loops does not exceed a predetermined loop count, the controller may determine that the cells have entered their intended program states and are thus successfully programmed. Otherwise, if the total number of programming loops exceeds the predetermined loop count before the cells transition into their respective programming states, the controller may determine that a program failure has occurred.

Figure 6:
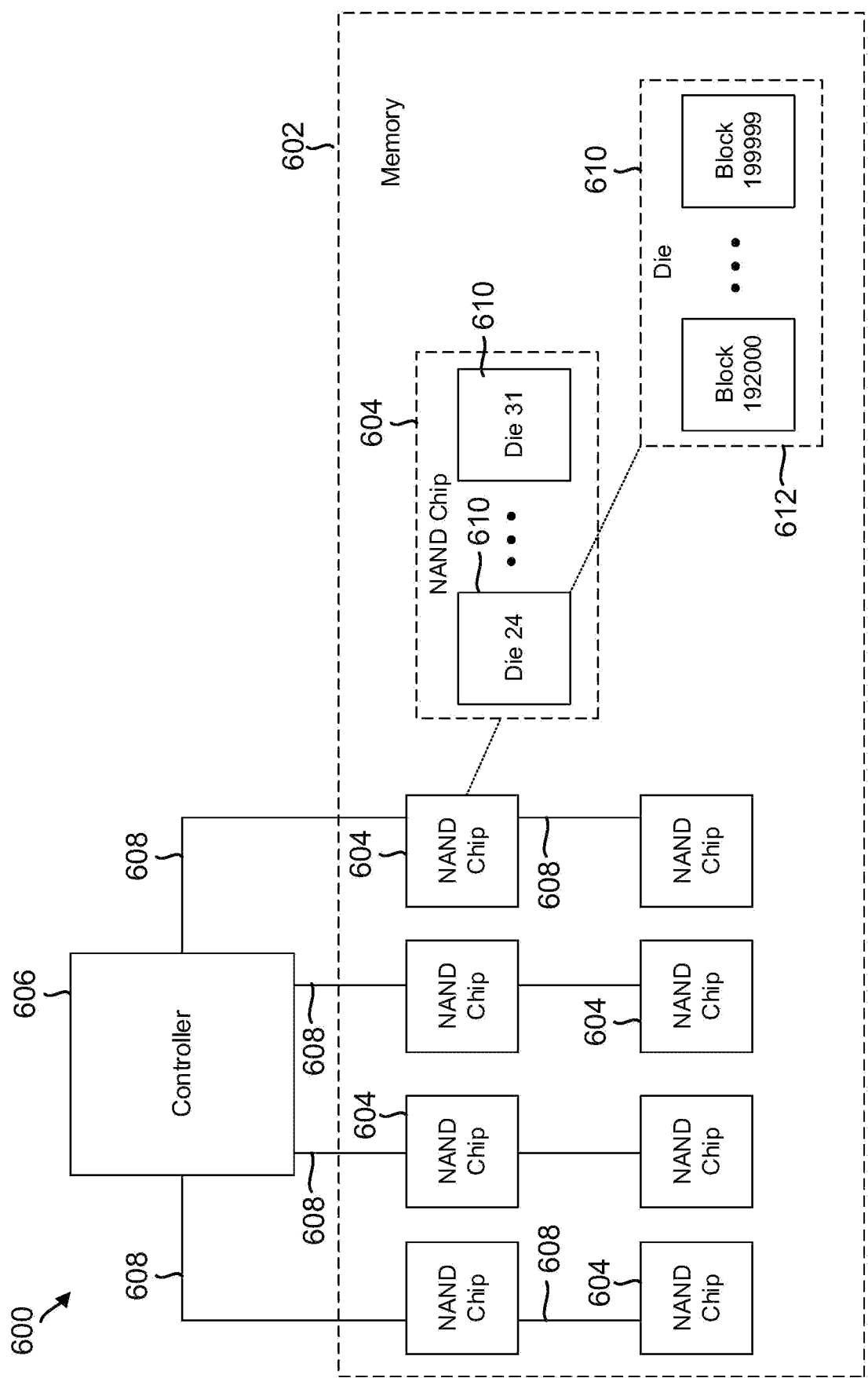
FIG. 6 is a conceptual diagram illustrating an example of multiple NAND chips coupled to a controller of the storage device of FIG. 1.

FIG. 6 illustrates an example 600 of a memory 602 including NAND chips 604 that are communicatively coupled to a controller 606 via multiple channels 608. Each NAND chip may include multiple dies 610, and each die 610 may include multiple planes (not shown) each including multiple blocks 612. Each die may also be associated with a physical die address, and each block may be associated with a physical block address. For instance, in the illustrated example of FIG. 6, one of the NAND chips may include dies 24-31 (dies associated with physical die addresses 24-31), and one of the blocks of die 24 may include blocks 192000-199999 (blocks associated with physical block addresses 192000-199999). In other examples, the dies and blocks of each NAND chip may have different physical addresses and ranges. Memory 602 may correspond to NVM 110, controller 606 may correspond to controller 123 of FIG. 1, dies 610 may correspond to dies 114 of FIG. 1, and blocks 612 may correspond to blocks 402 of FIG. 4.

Each channel 608 may be a bus that carries data (e.g., data 119) between the controller 606 and one or more of the NAND chips, and each channel may be parallel to the other channels. Thus, controller 606 may simultaneously read or write data in dies 610 across multiple channels 608. For example, controller 606 may read or write data in one of the dies 610 coupled to each channel 608 at the same time (e.g., in four dies simultaneously in the example of FIG. 6). Similarly, the controller 606 may simultaneously read or write data across multiple planes. For example, if each die 610 includes two planes, controller 606 may read or write data in one of the blocks 612 in each plane of each aforementioned die at the same time (e.g., in eight blocks assuming two planes per die in the example of FIG. 6). While the example of FIG. 6 illustrates four channels coupled between the controller 606 and the memory 602, in other examples, a different number of channels may be coupled between the controller and the memory (e.g., 8 channels, 10 channels, etc.).

The controller 123, 606 may logically group dies (e.g., dies 114, 610) to form logical meta dies and physically group the dies to form physical meta dies. A logical meta die is a logical grouping of dies, and a physical meta die is a physical grouping of dies which may be read or written in parallel. For instance, a logical meta die may be indicated by a single address (e.g., a logical meta die address) which is mapped to logical addresses associated with different dies, and a physical meta die may be indicated by a single address (e.g., a physical meta die address) which is mapped to physical addresses associated with dies coupled to different channels. In one example, when the controller 123, 606 reads or writes data in a logical meta die associated with a logical meta die address, the controller translates the logical meta die address to a physical meta die address, and the controller senses or program data in cells of the dies 114, 610 in the physical meta die associated with the identified physical meta die address. Moreover, since the dies of the physical meta die may be coupled to different channels 608, the controller may read or write data in multiple dies in parallel across the different channels.

Figure 7:
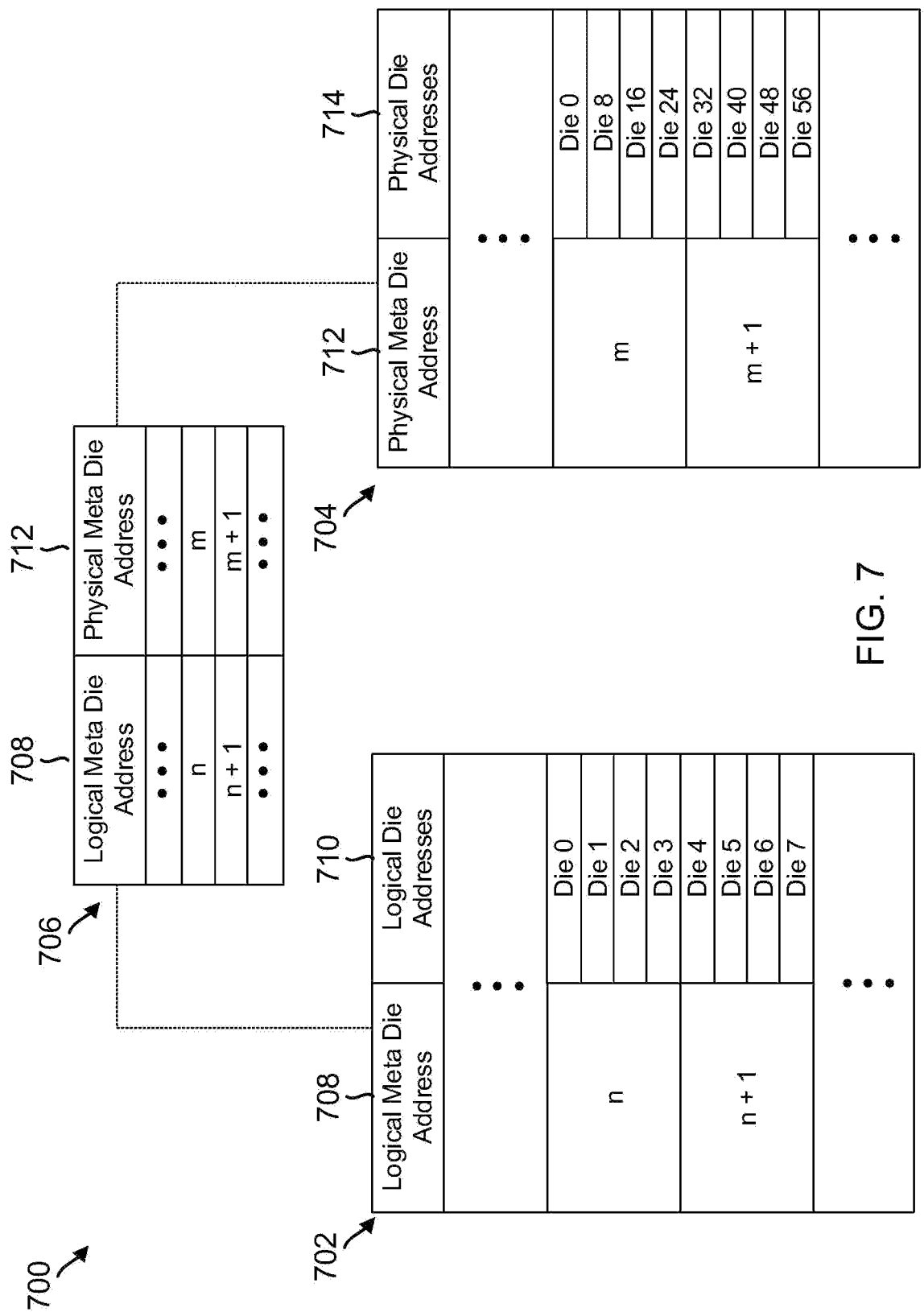
FIG. 7 is a conceptual diagram illustrating an example of logical and physical meta die mapping tables in the storage device of FIG. 1.

FIG. 7 illustrates an example 700 of mapping tables 702, 704, 706 which include various logical meta die and physical meta die mappings. For instance, mapping table 702 may include mappings of logical meta dies each associated with a logical meta die address 708 to a plurality of dies each associated with a logical die address 710. Mapping table 704 may include mappings of physical meta dies each associated with a physical meta die address 712 to a plurality of dies each associated with a physical die address 714. Mapping table 706 may include one-to-one mappings of individual logical meta dies each associated with one of the logical meta die addresses 708 to individual physical meta dies each associated with one of the physical meta die addresses 712. The dies in this example may correspond, for instance, to dies 114, 610 in FIG. 6. While FIG. 7 illustrates the example where the controller maintains three different mapping tables indicating the various logical and physical meta die mappings, a different number of mapping tables may be maintained in other examples. For example, the mapping tables 702, 704, 706 may be combined into a single mapping table, combined into two mapping tables, or split into more than three mapping tables. Moreover, while the example of FIG. 7 illustrates mapping tables 702, 704, 706 separately from L2P mapping table 120, 205 of FIGS. 1 and 2, any of these mapping tables may be combined with the L2P mapping table.

The controller may form various logical meta dies and map each logical meta die to dies having different logical addresses. For instance, as illustrated in mapping table 702, the controller may form one logical meta die n including four logical dies 0-3 (e.g., dies associated with logical addresses 0-3) and another logical meta die n+1 including four logical dies 4-7 (dies associated with logical addresses 4-7). Alternatively, the controller may include a different number of dies in each logical meta die or associate different logical die addresses with the logical meta dies in other examples. Similarly, the controller may form various physical meta dies and map each physical meta die to dies on different channels (e.g., channels 608) and having different physical addresses. For instance, as illustrated in mapping table 704, the controller may form one physical meta die m including four physical dies 0, 8, 16, and 24 (e.g., dies associated with physical addresses 0, 8, 16, and 24) and another physical meta die m+1 including four physical dies 32, 40, 48, 56 (e.g., dies associated with physical addresses 32, 40, 48, and 56). For instance, physical die 24 grouped in physical meta die m may correspond to die 24 on one of the channels 608 in FIG. 6, while the other dies within physical meta die m may be respectively coupled to the other channels. Alternatively, the controller may include a different number of dies in each physical meta die or associate different physical die addresses with the physical meta dies in other examples.

After forming the logical meta dies and physical meta dies, the controller may map each individual logical meta die to each individual physical meta die according to a one-to-one mapping. For instance, as illustrated in mapping table 706, the controller may map logical meta die n to physical meta die m, and the controller may separately map logical meta die n+1 to physical meta die m+1. The mappings in mapping tables 702, 704, 706 allow the controller to identify the dies in which to simultaneously read or write data in response to a host command. For example, if the controller receives a host command to read or write data in one or more blocks of logical dies 0-3, the controller may identify logical meta die n from mapping table 702, translate logical meta die n to physical meta die m in mapping table 706, identify physical dies 0, 8, 16, and 24 in mapping table 704, and read or write data in the blocks in those physical dies. Alternatively, the controller may map the logical and physical meta dies differently in other examples, such as in a single mapping table combining mapping tables 702, 704, 706 with L2P mapping table 120, 205, or in other mapping tables combining any one or more of these tables.

Similarly, the controller 123, 606 may logically group blocks (e.g., blocks 402, 612) to form logical meta blocks and physically group the blocks to form physical meta blocks. A logical meta block is a logical grouping of blocks, and a physical meta block is a physical grouping of blocks which may be read or written in parallel. For instance, a logical meta block may be indicated by a single address (e.g., a logical meta block address) which is mapped to logical addresses associated with different blocks, and a physical meta block may be indicated by a single address (e.g., a physical meta block address) which is mapped to physical addresses associated with blocks in dies coupled to different channels. In one example, when the controller 123, 606 reads or writes data in a logical meta block associated with a logical meta block address, the controller translates the logical meta block address to a physical meta block address, and the controller senses or program data in cells of the blocks 402, 612 in the physical meta block associated with the identified physical meta block address. Moreover, since the blocks of the physical meta block may not only be within dies coupled to different channels 608 but also within different planes, the controller may read or write data in multiple blocks in parallel across the different channels and planes.

Figure 8:
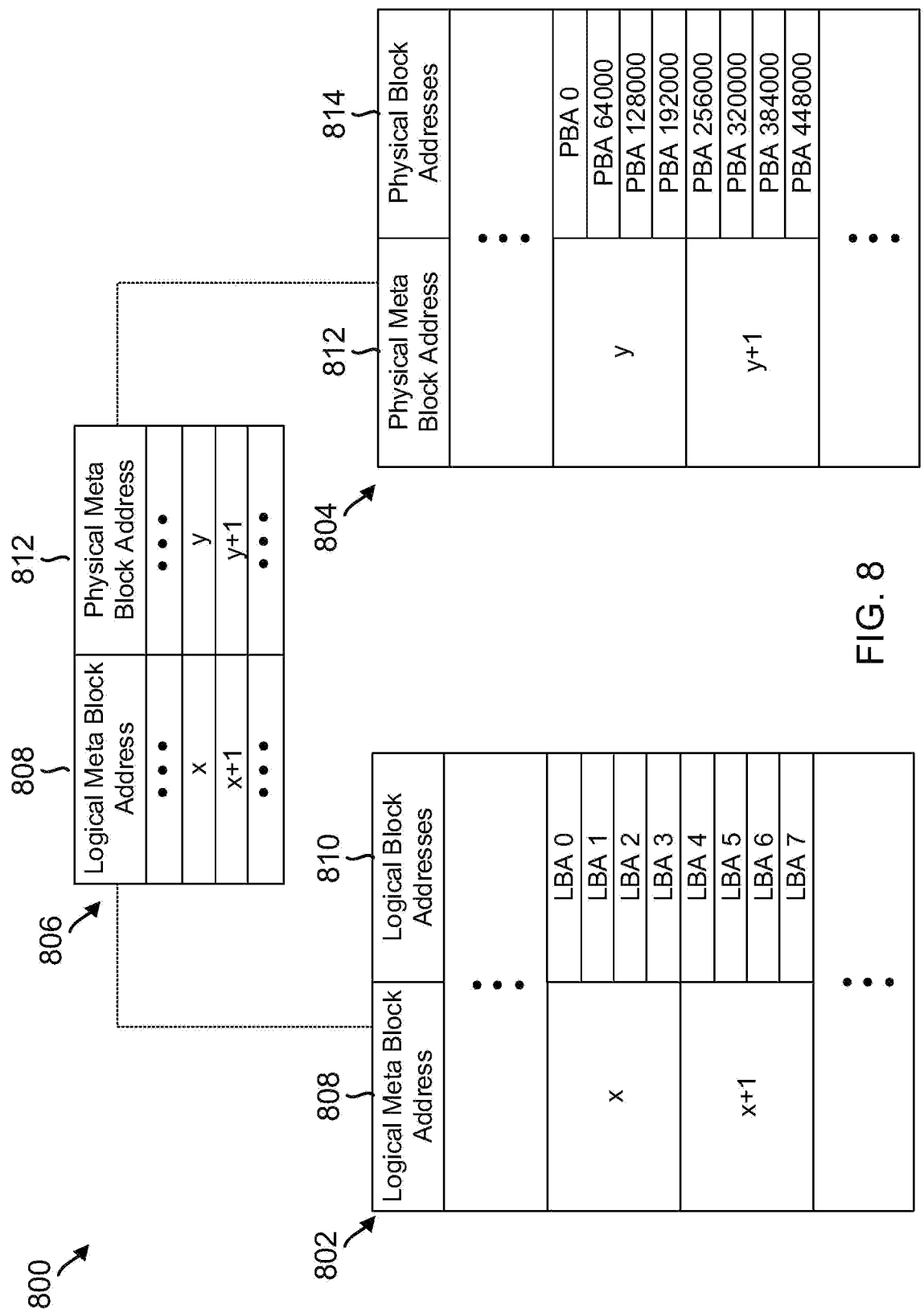
FIG. 8 is a conceptual diagram illustrating an example of logical and physical meta block mapping tables in the storage device of FIG. 1.

FIG. 8 illustrates an example 800 of mapping tables 802, 804, 806 which include various logical meta block and physical meta block mappings. For instance, mapping table 802 may include mappings of logical meta blocks each associated with a logical meta block address 808 to a plurality of blocks each associated with a logical block address 810 (e.g., logical addresses 208 or LBAs). Mapping table 804 may include mappings of physical meta blocks each associated with a physical meta block address 812 to a plurality of blocks each associated with a physical block address 814 (e.g., physical addresses 210 or PBAs). Mapping table 806 may include mappings of logical meta blocks each associated with one of the logical meta block addresses 808 to physical meta blocks each associated with one of the physical meta block addresses 812. The blocks in this example may correspond, for instance, to blocks 402, 612 in FIGS. 4 and 6. While FIG. 8 illustrates the example where the controller maintains three different mapping tables indicating the various logical and physical meta block mappings, a different number of mapping tables may be maintained in other examples. For example, the mapping tables 802, 804, 806 may be combined into a single mapping table, combined into two mapping tables, or split into more than three mapping tables. Moreover, while the example of FIG. 8 illustrates mapping tables 802, 804, 806 separately from L2P mapping table 120, 205 of FIGS. 1 and 2, any of these mapping tables may be combined with the L2P mapping table. Additionally, any of mapping tables 802, 804, 806 may be combined with any of mapping tables 702, 704, 706 in FIG. 7.

The controller may form various logical meta blocks and map each logical meta block to blocks having different logical addresses. For instance, as illustrated in mapping table 802, the controller may form one logical meta block x including four logical blocks 0-3 (e.g., blocks associated with logical addresses 0-3) and another logical meta block x+1 including four logical blocks 4-7 (e.g., blocks associated with logical addresses 4-7). Alternatively, the controller may include a different number of blocks in each logical meta block or associate different logical block addresses with the logical meta blocks in other examples. Similarly, the controller may form various physical meta blocks and map each physical meta block to blocks in different planes of dies on different channels (e.g., channels 608) and having different physical addresses. For instance, as illustrated in mapping table 804, the controller may form one physical meta block y including four physical blocks 0, 64000, 128000, 192000 (e.g., blocks associated with physical addresses 0, 64000, 128000, and 192000) and another physical meta block y+1 including four physical blocks 256000, 320000, 384000, 448000 (e.g., blocks associated with physical addresses 256000, 320000, 384000, 448000). For instance, physical block 192000 grouped in physical meta block y may correspond to block 192000 in a plane of die 24 on one of the channels 608 in FIG. 6, while the other blocks within physical meta block y may be respectively coupled to other planes, dies or channels. Alternatively, the controller may include a different number of blocks in each physical meta block or associate different physical block addresses with the physical meta blocks in other examples.

After forming the logical meta blocks and physical meta blocks, the controller may map logical meta blocks to physical meta blocks. For instance, as illustrated in mapping table 806, the controller may map logical meta block x to physical meta block y, and the controller may map logical meta block x+1 to physical meta block y+1. The mappings in mapping tables 802, 804, 806 allow the controller to identify the blocks in which to simultaneously read or write data in response to a host command. For example, if the controller receives a host command to read or write data in blocks associated with LBAs 0-3, the controller may identify logical meta block x from mapping table 802, translate logical meta block x to physical meta block y in mapping table 806, identify PBAs 0, 64000, 128000, and 192000 in mapping table 804, and read or write data in the blocks at those identified physical addresses. Alternatively, the controller may map the logical and physical meta blocks differently in other examples, such as in a single mapping table combining mapping tables 802, 804, 806 with L2P mapping table 120, 205, in a single mapping table combining tables 802, 804, 806 with mapping tables 702, 704, 706, or in other mapping tables combining any one or more of these tables.

Figure 9:
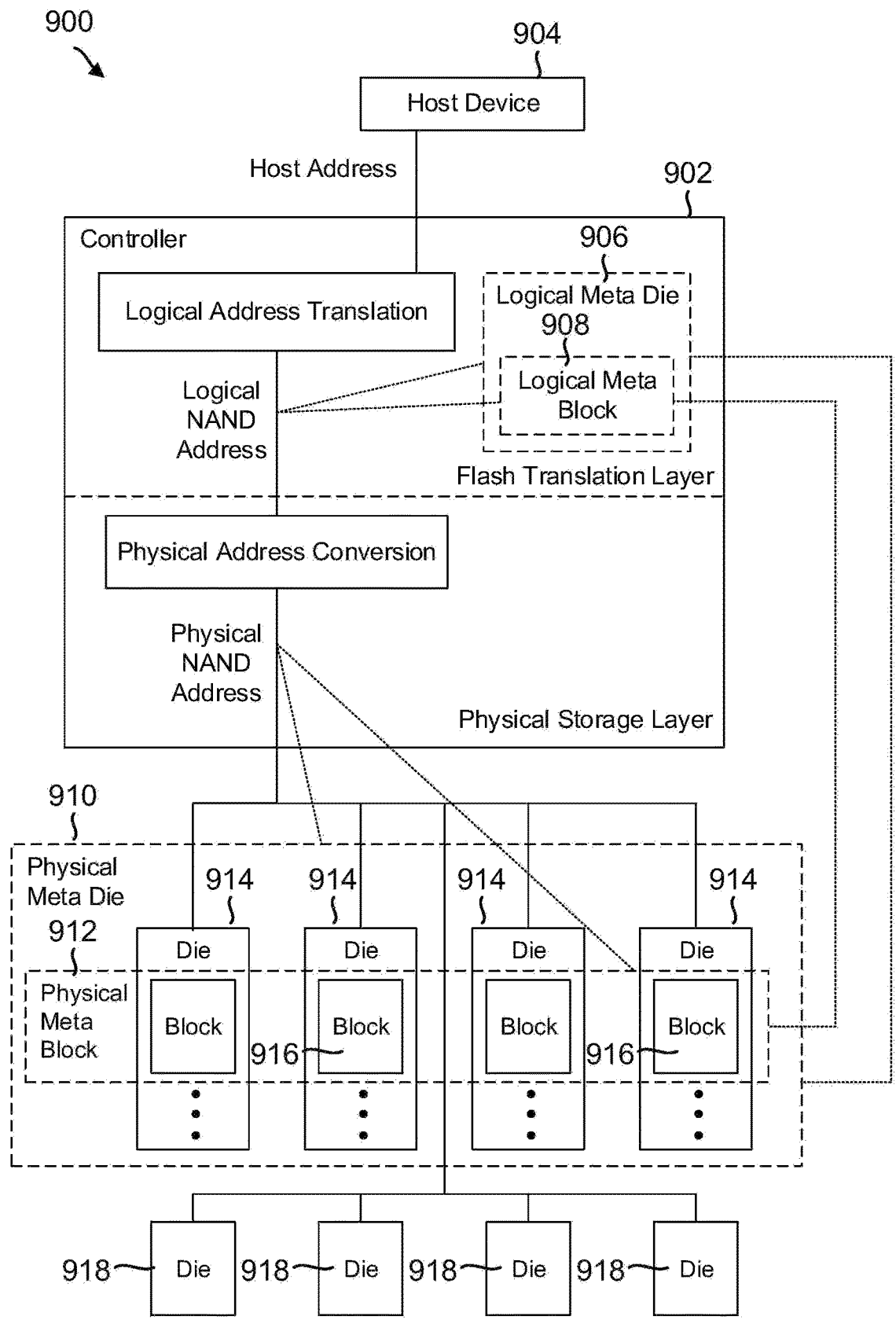
FIG. 9 is a conceptual diagram illustrating an example of a controller that maps a logical meta die to a single physical meta die in the storage device of FIG. 1.

FIG. 9 illustrates an example 900 of a controller 902 (e.g., controller 123, 606) that reads or writes data in logical and physical meta dies and meta blocks following a one-to-one mapping between logical and physical meta dies. In one example, the controller 902 may receive from a host device 904 (e.g., host device 104) a command including a host address to read or write data in memory. For instance, the host address may include one or more logical addresses of blocks (e.g., blocks 402, 612) in one or more dies (e.g., dies 114, 610) in which to read or write data.

Upon receiving the host address, the controller 902 may translate the host address to a logical NAND address (e.g., in a flash translation layer of the controller). For instance, the controller may identify one or more logical meta block addresses (e.g., logical meta block address 808) and one or more logical meta die addresses (e.g., logical meta die address 708) associated with the host address. Each identified logical meta die address may be associated with a logical meta die 906, and each identified logical meta block address may be associated with a logical meta block 908. The controller may identify the addresses of the logical meta dies and logical meta blocks from one or more mapping tables (e.g., L2P mapping table 120, 205, mapping tables 702, 802).

After identifying the logical NAND address, the controller 902 may convert the address to a physical NAND address (e.g., in a physical storage layer of the controller). For instance, the controller may identify a single physical meta block address (e.g., physical meta block address 812) and a single physical meta die address (e.g., physical meta die address 712) associated with the logical NAND address. The identified physical meta die address may be associated with a physical meta die 910, and the identified physical meta block address may be associated with a physical meta block 912. The controller may identify the address of the physical meta die and physical meta block from one or more mapping tables (e.g., L2P mapping table 120, 205, mapping tables 706, 806).

The controller may then identify the physical NAND address, including the physical block addresses associated with the identified physical meta block and the physical die addresses associated with the identified physical meta die, from the physical meta die and meta block address. Each identified physical die address may be associated with a physical die 914 (e.g., die 114, 610), and each identified physical block address may be associated with a physical block 916 (e.g., block 402, 612). The controller may identify the addresses of the physical dies and blocks from one or more mapping tables (e.g., L2P mapping table 120, 205, mapping tables 704, 804). Upon identifying the physical NAND address, the controller may read or write data in the blocks 916 of the dies 914 accordingly in response to the command from host device 904.

Generally, the controller 123, 606, 902 maps a single logical meta die (e.g., logical meta die 906) to a single physical meta die (e.g., physical meta die 910). For example, as illustrated in mapping table 706 of FIG. 7, the controller may map logical meta die n to physical meta die m, logical meta die n+1 to physical meta die m+1, etc. according to a one-to-one mapping of logical to physical meta dies. However, as additional dies and blocks (e.g., in NAND chips 604) are added to storage device 102 to increase storage capacity, such one-to-one mapping may result in added firmware complexity in logical mapping and data protection. For instance, in the examples shown in FIGS. 7 and 9, if new dies 918 are added to the memory to increase storage capacity, the controller 902 may perform a variety of mapping steps to associate these new dies with a new logical and physical meta die. For example, the controller may form a new logical meta die including new dies 918, add a new entry to mapping table 702 associating the new logical meta die with a new logical meta die address, form a new physical meta die including new dies 918, add a new entry to mapping table 704 associating the new physical meta die with a new physical meta die address, and add a new entry to mapping table 706 associating the new logical meta die address with the new physical meta die address. Alternatively, if the controller adds the new dies 918 to the existing physical meta die 910 rather than creating a new physical meta die, such approach may similarly increase firmware complexity when implementing error correction. For instance, if an error occurs in one of the blocks 916, the controller 902 may perform additional XOR parity checks to recover the data as a result of the increase in size of physical meta die 910.

Additionally, when mapping a logical meta die to a physical meta die according to a one-to-one mapping as described above, the controller may perform such mapping only if an equal number of blocks for storing host data exists across all dies of the physical meta die. For instance, in the example of FIG. 9, the controller 902 may form physical meta die 910 and map that physical meta die to logical meta die 906 if all of the dies 914 in the physical meta die 910 include the same number of blocks 916. Such constraint may limit the number of logical and physical meta dies which may be formed, as well as the number of logical and physical meta blocks.

Figure 10:
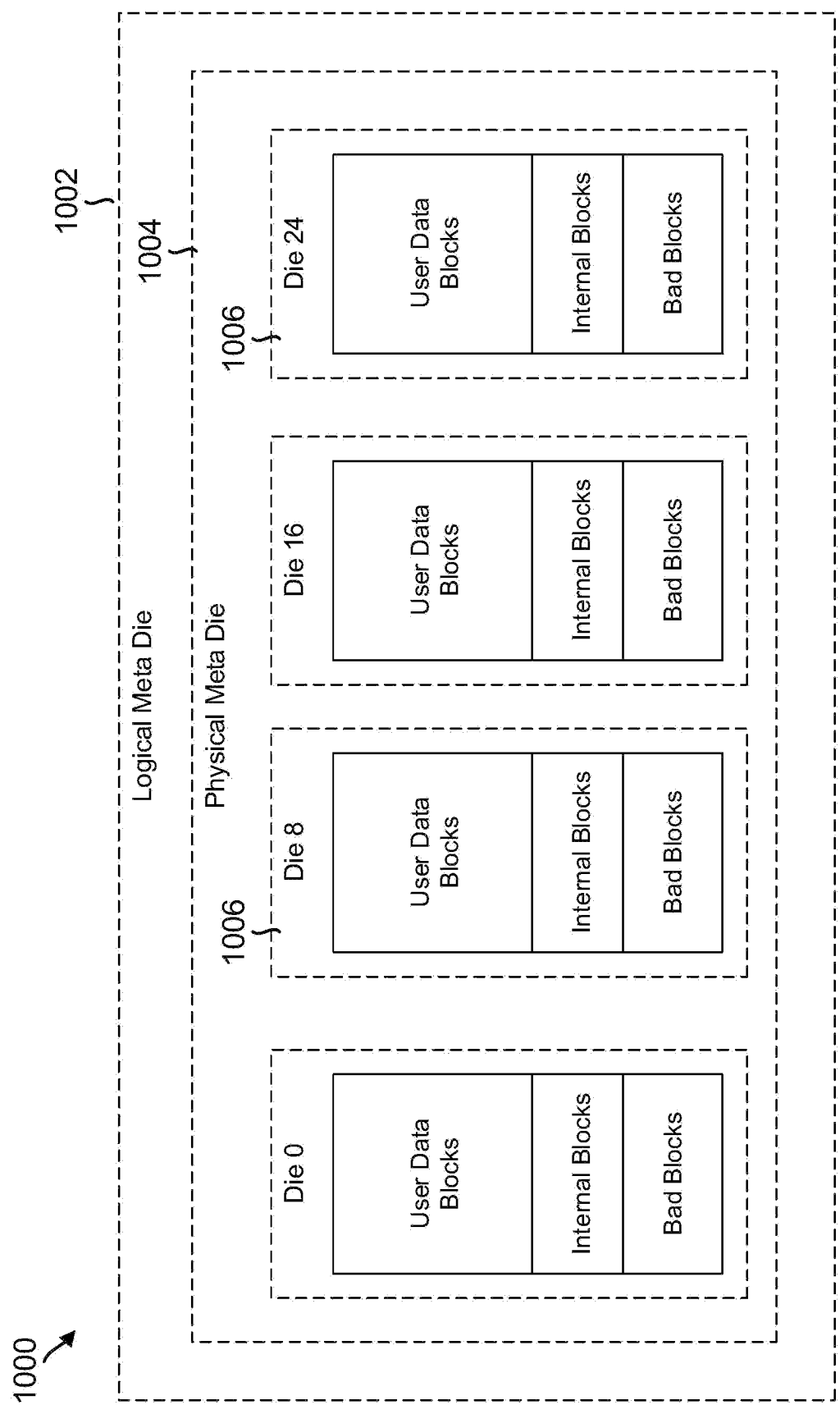
FIG. 10 is a conceptual diagram illustrating an example of blocks in various dies of a single physical meta die mapped to a single logical meta die in the storage device of FIG. 1.

For instance, FIG. 10 illustrates an example 1000 of a logical meta die 1002 that is mapped to a physical meta die 1004 including multiple dies 1006. For example, dies 1006 may include physical die addresses 0, 8, 16, and 24 corresponding to the physical die addresses 714 within mapping table 704 of FIG. 7. Each of the dies 1006 include multiple blocks (e.g., blocks 402, 612), including user data blocks, internal blocks, and bad blocks. User data blocks refer to blocks in which the controller may store host data. Internal blocks refer to blocks in which the controller may store system or control information for the storage device (e.g., mapping tables). Bad blocks include blocks which are identified to have at least a threshold number of read, program, or erase errors during manufacturer testing or during the run time or life of the storage device 102.

As illustrated in the example of FIG. 10, each of the dies 1006 of physical meta die 1004 include a same number of user data blocks. For instance, each of the dies may include a thousand blocks for storing host data (or some other common number of blocks). As a result, the controller may group the dies 1006 into physical meta die 1004 and map the physical meta die to the logical meta die 1002 as described above. However, if any of the dies 1006 subsequently do not include the same number of user data blocks (e.g., if one of the user data blocks in one of the dies later becomes a bad block), the controller may no longer group the dies into the same physical meta die. Similarly, the controller may no longer be able to form physical meta blocks from all of the blocks in these dies. As a result, the controller may un-form the physical meta die 1004, the logical meta die 1002, and any logical and physical meta blocks associated with these dies 1006. The controller may also update the mapping tables in response to un-formed logical and physical meta dies (e.g., mapping tables 702, 704, 706) and un-formed logical and physical meta blocks (e.g., mapping tables 802, 804, 806), resulting in further firmware complexity in addition to that imposed due to added dies and blocks.

Accordingly, to simplify controller management of added dies and blocks, the controller 123, 606, 902 may map logical meta dies 906, 1002 to multiple physical meta dies 910, 1004. For example, rather than mapping a single logical meta die to a single physical meta die according to a one-to-one mapping as described above, the controller may map the single logical meta die to multiple physical meta dies according to a one-to-many mapping. For instance, referring to FIG. 7, the controller may associate logical meta die n with both physical meta dies m and m+1 in mapping table 706 (rather than only with physical meta die m), and the controller may associate logical meta die n+1 with additional physical meta dies (not shown). In this way, firmware complexity may be reduced in comparison to the one-to-one mapping approach described above. For example, referring to FIGS. 7 and 9, if new dies 918 are added in a new physical meta die associated with a new physical meta die address, the controller may simply update mapping tables 704 and 706 to form the new physical meta die and associate the new physical meta die address with an existing logical meta die address. In contrast, the controller may refrain from updating mapping table 702 since the controller may not create a new logical meta die, thus reducing firmware complexity in managing the mappings. Moreover, the controller may form new physical meta blocks in the new physical meta die with the same number of blocks as other physical meta blocks, thus maintaining the same number of XOR parity checks per physical meta block and further saving firmware complexity.

The one-to-many mapping of logical meta dies to physical meta dies may also provide more flexibility in terms of the number of user data blocks that can be available in each die to form a physical meta die. For example, when mapping a logical meta die to physical meta dies according to a one-to-many mapping as described above, the controller may perform such mapping even if an unequal number of blocks for storing host data exists across all dies of the physical meta die, so long as the sums of the number of blocks across corresponding dies (dies coupled to the same channel) are the same across physical meta dies. An example of this summation constraint is illustrated and described below with respect to FIG. 11. As a result, more logical and physical meta dies may be formed, as well as logical and physical meta blocks, in contrast to when the one-to-one mapping approach is applied.

Figure 11:
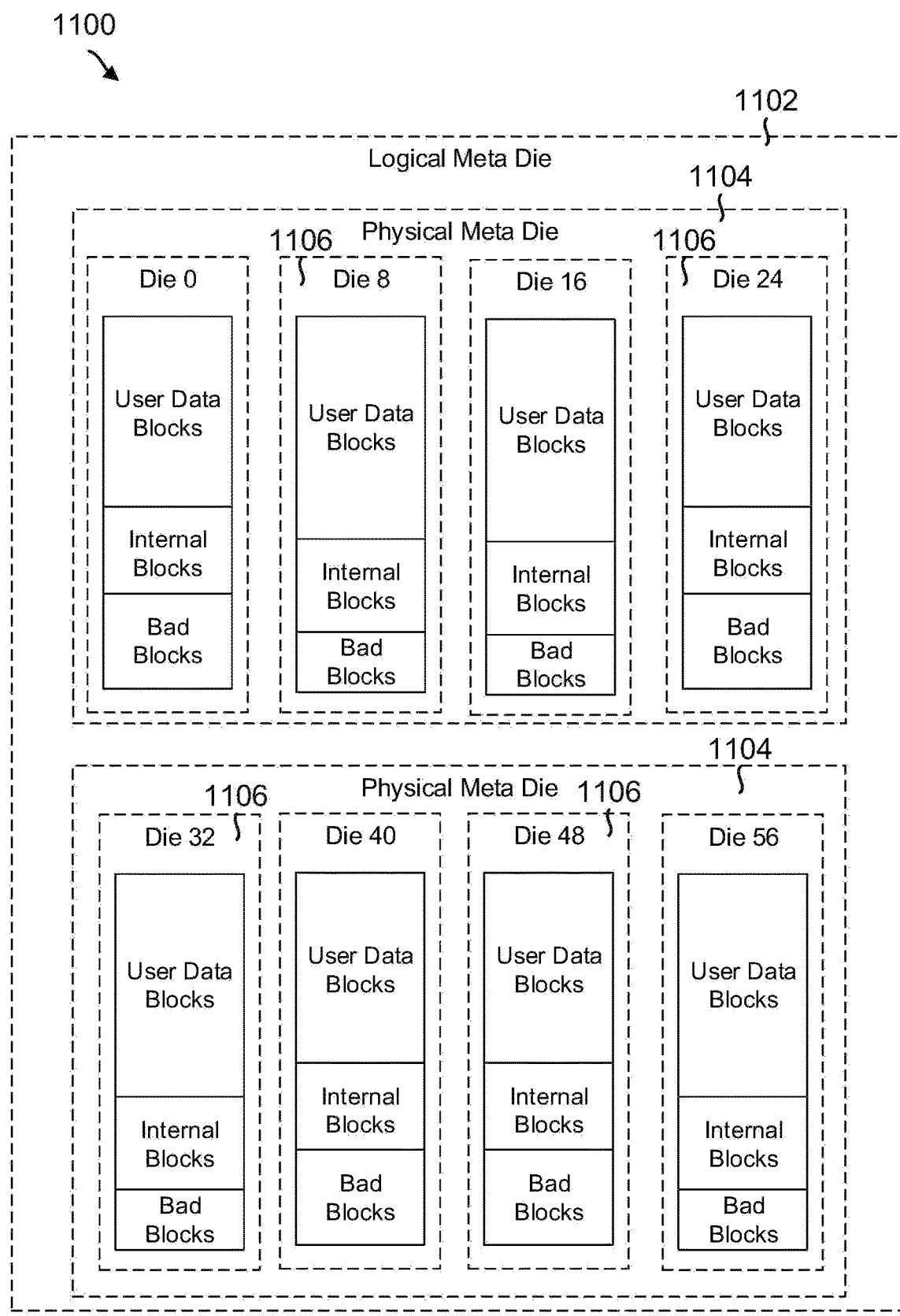
FIG. 11 is a conceptual diagram illustrating an example of blocks in various dies of multiple physical meta dies mapped to a single logical meta die in the storage device of FIG. 1.

For instance, FIG. 11 illustrates an example 1100 of a logical meta die 1102 that is mapped to multiple physical meta dies 1104 each including multiple dies 1106. For example, dies 1106 may include physical die addresses 0, 8, 16, 24, 32, 40, 48, 56 corresponding to the physical die addresses 714 within mapping table 704 of FIG. 7. Moreover, each pair of dies that occupy a similar position in their respective physical meta die (e.g., dies 0 and 32, dies 8 and 40, dies 16 and 48, and dies 24 and 56 in this example) are referred to in this disclosure as corresponding dies. For instance, dies 0 and 32 may correspond to each other since they both are coupled to the same channel, dies 8 and 40 may correspond to each other since they both are coupled to the same channel, etc. Each of the dies 1106 include multiple blocks (e.g., blocks 402, 612), including user data blocks, internal blocks, and bad blocks.

As illustrated in the example of FIG. 11, each of the dies 1106 of physical meta dies 1104 may include a different number of user data blocks. For instance, some of the dies (e.g., dies 0, 24, 40, and 48) may include 1000 blocks for storing host data (or some other number of blocks), while others of the dies (e.g., dies 8, 16, 32, and 56) may include 1100 blocks for storing host data (or some other number of blocks). Moreover, the sums of the number of blocks in corresponding dies are the same across the physical meta blocks. For example, the sum of the user data blocks in corresponding dies 0 and 32 (e.g., 2100=1000+1100), the sum of the user data blocks in corresponding dies 8 and 40 (e.g., 2100=1100+1000), the sum of the user data blocks in corresponding dies 16 and 48 (e.g., 2100=1100+1000), and the sum of the user data blocks in corresponding dies 24 and 56 (e.g., 2100=1000+1100), are all the same value. As a result, the controller may group the dies 1106 into physical meta dies 1104 notwithstanding their unequal number of user data blocks, subject to their sums being the same as described above, and the controller may map the physical meta dies to the logical meta die 1102.

Furthermore, each time the controller simultaneously reads or writes data in a logical meta die mapped to multiple physical meta dies, the controller may read or write data in only a single physical meta die. For instance, referring to FIG. 7, if the logical meta die n is mapped to physical meta dies m and m+1 as described above, and if the controller receives a command to read or write data in logical meta die n, the controller may simultaneously read or write data in either physical meta die m or physical meta die m+1 (but not both). For example, referring to the illustrated example of FIG. 7, if the controller receives a command to read or write data in logical dies 0-3, the controller may either read or write data in physical dies 0, 8, 16, 24 at the same time or in physical dies 32, 40, 48, and 56 at the same time, but not in both sets of physical dies at the same time. Similarly, each time the controller simultaneously reads or writes data in a logical meta block mapped to a physical meta block, the controller may read or write data in only a single physical meta die including that physical meta block. For instance, referring to FIGS. 6-8, if the controller receives a command to read or write data in logical meta block x or logical meta block x+1 (e.g., in blocks 612 across dies 610 of logical meta die n), the controller may either read or write data in physical meta block y or in physical meta block y+1 (e.g., in blocks 612 across dies 610 of physical meta die m or physical meta die m+1, respectively). Thus, different logical meta blocks of the same logical meta die may be associated with different physical meta blocks of multiple physical meta dies.

Figure 12:
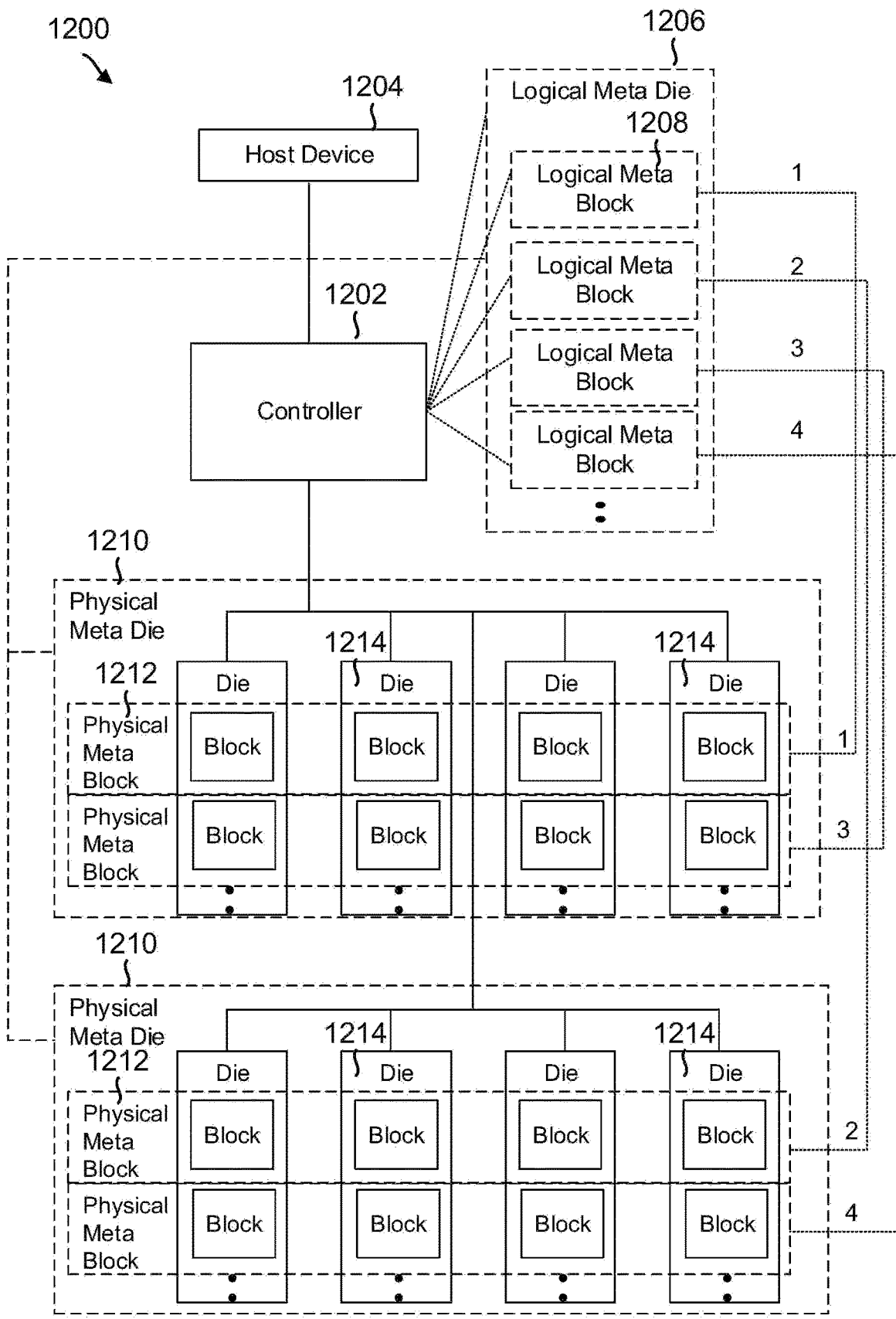
FIG. 12 is a conceptual diagram illustrating an example of a controller that maps a logical meta die to multiple physical meta dies in the storage device of FIG. 1.

FIG. 12 illustrates an example 1200 of a controller 1202 (e.g., controller 123, 606, 902) that reads or writes data in logical and physical meta dies and meta blocks following a one-to-many mapping between logical and physical meta dies. In one example, the controller may receive a command from a host device 1204 (e.g., host device 104, 904) including a host address to read or write data in memory. For instance, the host address may include one or more logical addresses of blocks (e.g., blocks 402, 612) in one or more dies (e.g., dies 114, 610) in which to read or write data.

Upon receiving the host address, the controller 1202 may translate the host address to a logical NAND address. For instance, the controller may identify one or more logical meta block addresses (e.g., logical meta block address 808) and one or more logical meta die addresses (e.g., logical meta die address 708) associated with the host address. Each identified logical meta die address may be associated with a logical meta die 1206, and each identified logical meta block address may be associated with a logical meta block 1208. The controller may identify the addresses of the logical meta dies and logical meta blocks from one or more mapping tables (e.g., L2P mapping table 120, 205, mapping tables 702, 802).

After identifying the logical NAND address, the controller 1202 may convert the address to a physical NAND address. For instance, the controller may identify multiple physical meta block addresses (e.g., physical meta block addresses 812) and multiple physical meta die addresses (e.g., physical meta die addresses 712) associated with the logical NAND address. Each identified physical meta die address may be associated with a physical meta die 1210, and each identified physical meta block address may be associated with a physical meta block 1212. The controller may identify the addresses of the physical meta dies and physical meta blocks from one or more mapping tables (e.g., L2P mapping table 120, 205, mapping tables 706, 806).

The controller may then identify the physical NAND address, including the physical block addresses associated with the identified physical meta blocks and the physical die addresses associated with the identified physical meta dies, from the physical meta die and meta block addresses. Each identified physical die address may be associated with a physical die 1214 (e.g., die 114, 610, 914), and each identified physical block address may be associated with a physical block (e.g., block 402, 612, 916). The controller may identify the addresses of the physical dies and blocks from one or more mapping tables (e.g., L2P mapping table 120, 205, mapping tables 704, 804). Upon identifying the physical NAND address, the controller may read or write data in the blocks of the dies 1214 accordingly in response to the command from host device 1204.

When mapping logical meta blocks 1208 of logical meta die 1206 to physical meta blocks 1212 of physical meta dies 1210, the controller 1202 may switch between physical meta dies 1210 in alternating fashion. For instance, referring to FIG. 12, controller 1202 may first map a logical meta block of logical meta die 1206 to one of the physical meta blocks 1212 in a first one of the physical meta dies 1210, as illustrated by mapping '1' in the example of FIG. 12. For example, referring to FIGS. 7 and 8, the controller may map logical meta block x in logical meta die n to physical meta block y in physical meta die m by creating corresponding entries in one or more of the mapping tables. Next, controller 1202 may map a second logical meta block of logical meta die 1206 to one of the physical meta blocks 1212 in a second one of the physical meta dies 1210, as illustrated by mapping '2' in the example of FIG. 12. For example, referring to FIGS. 7 and 8, the controller may map logical meta block x+1 in logical meta die n to physical meta block y+1 in physical meta die m+1 by creating corresponding entries in one or more of the mapping tables. Then, controller 1202 may map a third logical meta block of logical meta die 1206 to another one of the physical meta blocks 1212 back in the first one of the physical meta dies 1210, as illustrated by mapping '3' in the example of FIG. 12. For example, referring to FIGS. 7 and 8, the controller may map logical meta block x+2 in logical meta die n to physical meta block y+2 in physical meta die m by creating corresponding entries in one or more of the mapping tables. Afterwards, controller 1202 may map a fourth logical meta block of logical meta die 1206 to another one of the physical meta blocks 1212 again in the second one of the physical meta dies 1210, as illustrated by mapping '4' in the example of FIG. 12. For example, referring to FIGS. 7 and 8, the controller may map logical meta block x+3 in logical meta die n to physical meta block y+3 in physical meta die m+1 by creating corresponding entries in one or more of the mapping tables. Controller 1202 may similarly proceed to map further logical meta blocks in logical meta die 1206 to further physical meta blocks 1212 in the physical meta dies 1210 by alternating or switching between the physical meta dies as described above.

Moreover, while the example of FIG. 12 illustrates two physical meta dies mapped to logical meta die 1206, in other examples there may be more than two physical meta dies mapped to the same logical meta die. In such case, the controller may similarly map logical meta blocks to physical meta blocks in alternating physical meta dies as described above. For instance, if three physical meta dies are mapped to the same logical meta die, the controller may map a logical meta block to a physical meta block initially in the first one of the physical meta dies, then to the second one of the physical meta dies, then to the third one of the physical meta dies, then back again to the first one of the physical meta dies, next again to the second one of the physical meta dies, then again to the third one of the physical meta dies, and so forth in alternating fashion.

Thus, the controller 1202 may map logical meta blocks 1208 of logical meta die 1206 to physical meta blocks 1212 while switching between physical meta dies 1210. However, once all physical blocks of a die in a physical meta die are mapped to logical meta blocks, the controller may no longer identify available blocks in that die for further mapping to logical meta blocks. Such circumstance may arise as a result of the one-to-many mapping of logical to physical meta dies, since dies within each physical meta die may include unequal numbers of user data blocks as described above with respect to FIG. 11. In such case, when the controller returns to a physical meta die including a die lacking available physical blocks (while alternating between physical meta dies), the controller may select an available block in a corresponding die of another physical meta die for mapping to a logical meta block. In this manner, the controller may continue to map logical meta blocks of a logical meta die to all available physical blocks in the physical meta dies until all logical meta blocks have been mapped. As a result, even with unequal numbers of user data blocks, an equal number of logical meta blocks 1208 in logical meta die 1206 and physical meta blocks 1212 across physical meta dies 1210 may be formed.

For instance, referring to the example of FIG. 11, the controller may initially map a user data block in dies 0, 8, 16 and 24 to a first logical meta block, then a user data block in dies 32, 40, 48, and 56 to a second logical meta block, another user data block in dies 0, 8, 16, and 24 to a third logical meta block, and so forth in alternating fashion. As a result, the controller may map all user data blocks in dies 0 and 24 before mapping all user data blocks in dies 8 and 16. Similarly, the controller may map all user data blocks in dies 40 and 48 before mapping all user data blocks in dies 32 and 56. In such case, when the controller returns to mapping user data blocks in dies 8 and 16 to a logical meta block, the controller may include user data blocks from corresponding dies 32 and 56 in the mapping. Similarly, when the controller returns to mapping user data blocks in dies 32 and 56 to a logical meta block, the controller may include user data blocks from corresponding dies 8 and 16 in the mapping. Thus, even while switching between physical meta dies with unequal numbers of blocks per die, the controller may continue to map logical meta blocks of a logical meta die to all available physical blocks in the physical meta dies until all of the logical meta blocks are mapped. As a result, an equal number of logical meta blocks in logical meta die 1102 and physical meta blocks across physical meta dies 1104 may still be formed.

Figure 13:
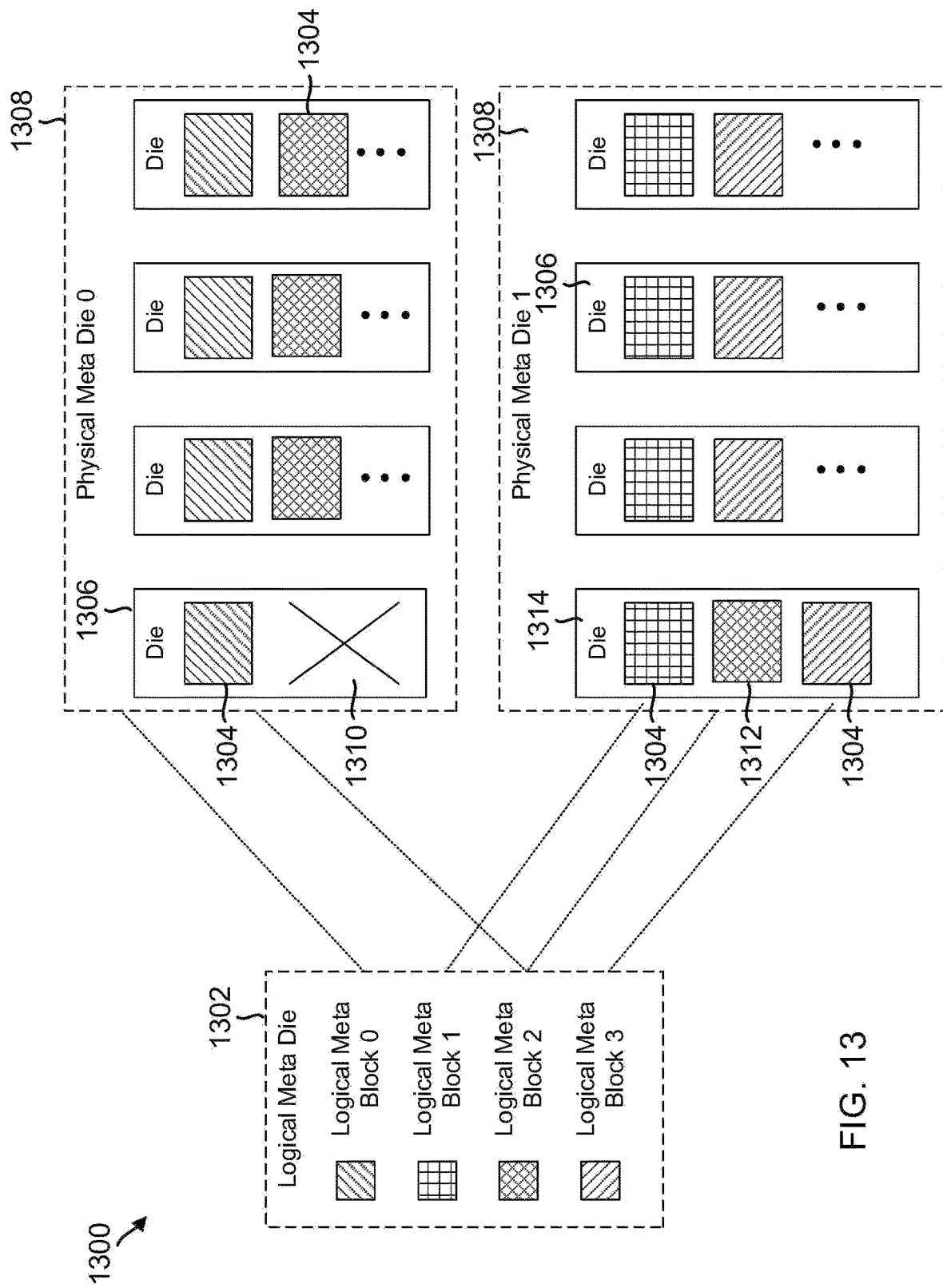
FIG. 13 is a conceptual diagram illustrating an example of logical meta blocks of a single logical meta die mapped to multiple physical meta dies in the storage device of FIG. 1.

FIG. 13 illustrates an example 1300 where logical meta blocks of a logical meta die 1302 are mapped to physical blocks 1304 in dies 1306 of physical meta dies 1308 in alternating fashion. For example, the logical meta blocks may correspond to logical meta blocks 1208, logical meta die 1302 may correspond to logical meta die 1206, dies 1306 may correspond to dies 1214, and physical meta dies 1308 may correspond to physical meta dies 1210 in FIG. 12. As illustrated in the example of FIG. 13, the controller may initially map logical meta block 0 to physical blocks 1304 across dies 1306 of physical meta die 0, and then map logical meta block 1 to physical blocks 1304 across dies 1306 of physical meta die 1. Afterwards, when the controller returns to physical meta die 0 for the logical meta block mapping, the controller may determine that one of the dies 1306 lacks available physical blocks 1310 for further meta block mapping. As a result, the controller may map logical meta block 2 to the physical block 1312 in the corresponding die 1314 of physical meta die 1, as well as to the physical blocks 1304 in the other dies of physical meta die 0 as before. The controller may then return to physical meta die 1 to map logical meta block 3 as previously described, and proceed similarly for further logical meta blocks until all physical blocks 1304 have been mapped.

Figure 14:
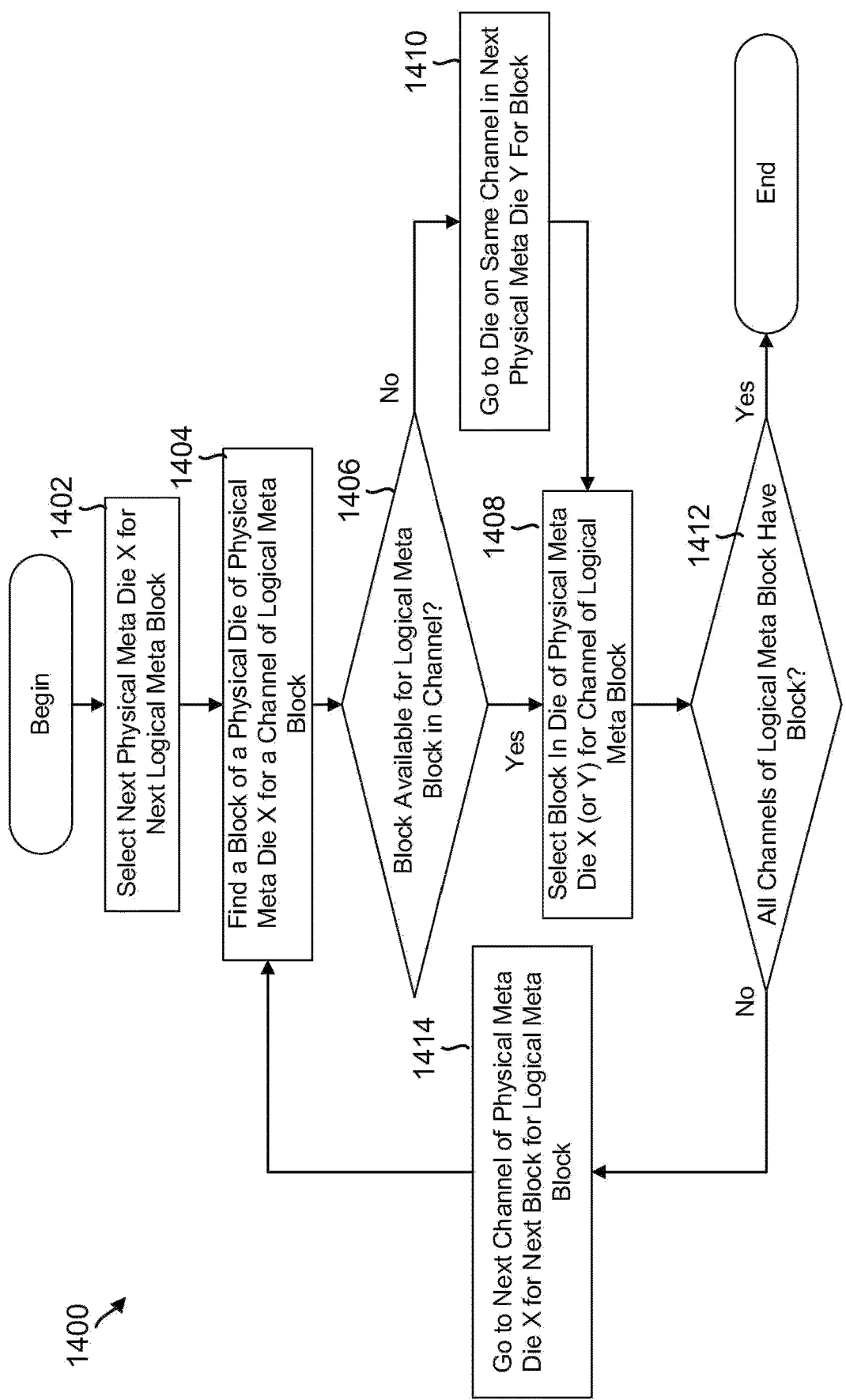
FIG. 14 is a flow chart illustrating a method for mapping logical meta blocks of a single logical meta die to blocks in multiple physical meta dies, as performed by the storage device of FIG. 1.

FIG. 14 illustrates an example flow chart 1400 of a method for mapping logical meta blocks to physical meta blocks across physical meta dies. For example, the method can be carried out in a storage device 102 such as the one illustrated in FIG. 1. Each of the steps in the flow chart can be controlled using the controller as described below (e.g. controller 123, 606, 902, 1202), by a component or module of the controller, or by some other suitable means.

As represented by block 1402, the controller may select a next physical meta die X for a next logical meta block. For instance, referring to FIGS. 12 and 13, the controller 1202 may select physical meta die 0 to map logical meta block 0 to physical blocks 1304 across dies 1306 in physical meta die 0. Next, as represented by block 1404, the controller may find a block of a physical die of physical meta die X for the logical meta block. For instance, referring to FIGS. 7, 8, 12 and 13, the controller 1202 may check one or more of the mapping tables 702, 704, 706, 802, 804, 806 to determine whether one of the physical blocks 1304 in one of the dies 1306 in physical meta die 0 is available to map to logical meta block 0 (e.g., it is not yet mapped to a logical meta block). If, as represented by block 1406, the controller determines that the physical block in physical meta die X is available to be mapped to the logical meta block, then as represented by block 1408, the controller selects that block of physical meta die X to map to the logical meta block. For instance, referring to FIGS. 12 and 13, the controller 1202 may add a mapping entry to one or more of the mapping tables 704, 706, 804, 806 which associates the physical block 1304 in one of the dies 1306 in physical meta die 0 to the logical meta block 0.

Alternatively, if back at block 1406, the controller determines that the physical block is not available to be mapped to the logical meta block, then as represented by block 1410, the controller finds a block from a corresponding die of a next physical meta die Y to map to the logical meta block. For instance, referring to FIGS. 12 and 13, if the controller 1202 determines that the die 1306 lacks available physical blocks 1310 for mapping to logical meta block 0, the controller may check one or more of the mapping tables 702, 704, 706, 802, 804, 806 to determine whether another one of the physical blocks 1304 in corresponding die 1314 of physical meta die 1 is available to map to logical meta block 0 (e.g., it is not yet mapped to a logical meta block). In such case, the controller selects that block of physical meta die Y to map to the logical meta block. For instance, referring to FIGS. 12 and 13, the controller 1202 may add a mapping entry to one or more of the mapping tables 704, 706, 804, 806 which associates the physical block 1304 in corresponding die 1314 in physical meta die 1 to the logical meta block 0.

Afterwards, if as represented by block 1412, the controller determines that there are not enough blocks yet mapped to the logical meta block (e.g., each logical meta block requires a number of blocks equal to the number of channels and that number of blocks has not yet been mapped), then as represented by block 1414, the controller proceeds to find another physical block in another physical die of physical meta die X for that logical meta block. For instance, referring to FIGS. 12 and 13, after the controller has mapped one of the physical blocks 1304 in one of the dies 1306 of physical meta die 0 (or in corresponding die 1314 of physical meta die 1) to logical meta block 0, the controller may determine that not all four blocks (or some other number) have been mapped to logical meta block 0, and so the controller may look for a physical block in another one of the dies 1306 of physical meta die 0 to map to logical meta block 0. The controller may then repeat the aforementioned process to continue mapping a block of each die in physical meta die X to that logical meta block. For instance, referring to FIGS. 12 and 13, the controller may continue mapping a physical block 1304 in each one of the dies 1306 of physical meta die 0 to logical meta block 0 until all four physical blocks have been mapped and logical meta block 0 has been completely formed.

Accordingly, after mapping logical meta blocks 1208 to physical meta blocks 1212, the controller 123, 606, 1202 may proceed to read or write data simultaneously in the physical blocks 1304 across dies 1306 as described above. For instance, the controller may read or write data in only one of the physical meta dies 1210, 1308 at a time when reading or writing data in the physical blocks 1304. Additionally, the controller may identify logical meta blocks 1208 from the mapped physical blocks, for example, for error management or other purposes. For example, if a read or write error occurs in one of the physical blocks 1304 or if the physical block becomes a bad block after a threshold number of read or write errors, the controller may check one or more of the mapping tables 702, 704, 706, 802, 804, 806 to identify the logical meta block 1208 and logical meta die 1206 associated with the physical address of that erring block. The controller may then modify the mapping tables to remove or replace the association of the erring block, report the error event including the logical meta block and logical meta die to the host device, or perform other actions in response to the identification. Moreover, where the number of physical blocks 1304 across dies 1214, 1306 of physical meta dies 1210, 1308 is unequal, such as illustrated in FIG. 11, the controller 123, 606, 1202 may perform additional steps besides checking the mapping tables in order to identify a logical meta block, for instance, as described below with respect to FIG. 15.

Figure 15:
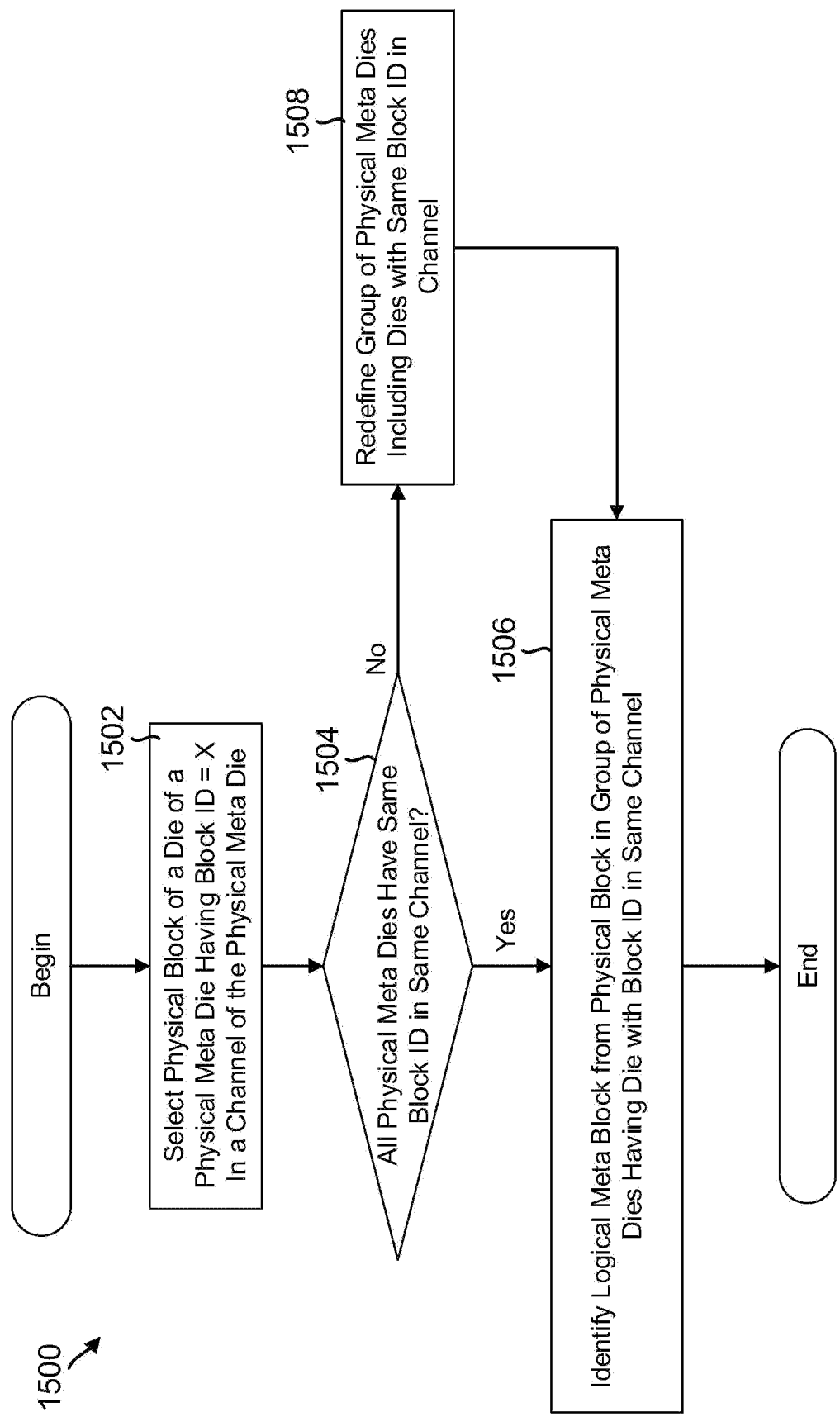
FIG. 15 is a flow chart illustrating a method for identifying a logical meta block of a single logical meta die from a block in one of multiple physical meta dies mapped to the single logical meta die, as performed by the storage device of FIG. 1.

FIG. 15 illustrates an example flow chart 1500 of a method for identifying a logical meta block of a logical meta die from a physical block of one of multiple physical meta dies mapped to the logical meta die. For example, the method can be carried out in a storage device 102 such as the one illustrated in FIG. 1. Each of the steps in the flow chart can be controlled using the controller as described below (e.g. controller 123, 606, 902, 1202), by a component or module of the controller, or by some other suitable means.

As represented by block 1502, the controller may select a physical block of a die of a physical meta die from which to identify the logical meta block. For instance, referring to FIGS. 12 and 13, the controller 1202 may determine that a read or write error occurred in one of the physical blocks 1304 of one of the physical meta dies 1210, 1308, or that the physical block 1304 has become a bad block after a threshold number of read or write errors, in response to which the controller may select that block from which to identify an associated logical meta block for error management or other purposes.

Next, as represented by block 1504, the controller may check whether the physical block to be identified from a die of a physical meta die includes a corresponding physical block in a corresponding die of another physical meta die. For instance, referring to FIGS. 11 and 12, if die 0 includes 1000 available blocks (e.g., blocks associated with identifiers 1-1000) and die 32 includes 1100 available blocks (e.g., blocks associated with identifiers 1-1100), the controller 1202 may determine that all user data blocks in die 0 and the first 1000 user data blocks in die 32 satisfy this condition (but not the last 100 user data blocks in die 32), since both dies include 1000 available physical blocks. That is, both physical meta dies in this example include block identifiers 1-1000 on the channel coupled to dies 0 and 32, while only one physical meta die includes block identifiers 1001-1100 on the channel coupled to dies 0 and 32.

If the controller determines that the physical block satisfies this condition, then as represented by block 1506, the controller may identify the logical meta block from the physical block. For instance, referring to the example of FIG. 11, the controller may identify a logical meta block from any of the user data blocks in die 0 or any of the first 1000 user data blocks in die 32 by applying the following example formula to determine the logical meta block address associated with the physical address of the user data block, where LMB is the logical meta block address, N is the number of physical meta dies, and BlockID is the block identifier or physical address of the user data block:

$$LMB = BlockID * N + (N-1)$$

Thus, logical meta blocks may be identified without relying on mapping tables or other lengthy information stored in memory. For instance, assume an example case where a logical meta die has 2 physical meta dies (a $1^{st}$ meta die and $2^{nd}$ meta die), a channel is coupled to two dies (a $1^{st}$ die belongs to $1^{st}$ meta die and $2^{nd}$ die belong to $2^{nd}$ meta die), and that on this channel, the $1^{st}$ die has 1000 blocks with identifiers/addresses from block #1 to block #1000, and the 2nd die has 1100 blocks with identifiers/addresses from block #1 to block #1100. Together with other dies in other channel, a total of 2100 (i.e. 1000+1100) logical meta blocks from logical metablock #1 to #2100 may be created. Additionally, assume in this example case that the controller is attempting to identify the logical meta block associated with block ID 500 in the 1st die. Accordingly, to identify which logical meta block is associated with block #500 of the 1st die of this channel, the controller may determine that the 1st die of the 1st meta die and the 2nd die of the 2nd meta die in this channel both have block with block ID=500. Therefore, the controller may group the 1st meta die and 2nd meta die together as 2 meta dies or 2 dies in this channel, and the controller may calculate the logical meta block from the aforementioned formula (assuming blockID=500 and N=2) to identify LMB #1000.

However, if the controller determines at block 1504 that the physical block does not satisfy this condition, then as represented by block 1508, the controller may redefine the group of physical meta dies such that the physical block identifier may be found in all physical meta dies of the group. Moreover, the controller may apply a different formula to determine the logical meta block address associated with the physical address of the user data block, such as the following example formula, where LMB is the logical meta block address, N is the number of physical meta dies, L is the last block ID which all physical meta dies include, BlockID is the block identifier or physical address of the user data block, and P is the number of physical meta dies in the redefined group (the number of physical meta dies including BlockID):

$$LMB = L*N + (BlockID - L)*P + (P-1),$$

For instance, assume an example case where a logical meta die has 2 physical meta dies (a 1st meta die and 2nd meta die), a channel is coupled to two dies (a 1st die belongs to 1st meta die and 2nd die belong to 2nd meta die), and that on this channel, the 1st die has 1000 blocks with identifiers/addresses from block #1 to block #1000, and the 2nd die has 1100 blocks with identifiers/addresses from block #1 to block #1100. Together with other dies in other channel, a total of 2100 (i.e. 1000+1100) logical meta blocks from logical metablock #1 to #2100 may be created. Additionally, assume in this example case that the controller is attempting to identify the logical meta block associated with block ID 1003 in the 2nd die. Accordingly, to identify which logical meta block is associated with block #1003 of the 2nd die of this channel, the controller may determine that the 1st die of the 1st meta die in this channel does not have a block with block ID=1003. Therefore, the controller may not include the 1st meta die in the group of physical meta dies, thus only leaving the 2nd meta die in the group (resulting in P=1). As a result, the controller may calculate the logical meta block from the aforementioned formula (assuming L=1000, blockID=1003, N=2, and P=1) to identify LMB #2003.

While the aforementioned description describes specific formulas for identifying a logical meta block from a physical block, the formulas are not so limited. For instance, the controller may calculate logical meta block addresses as a function of physical block addresses in other ways. Moreover, while the aforementioned examples refer specifically to the case where two physical meta dies are mapped to a logical meta block, the controller may similarly calculate logical meta blocks of a logical meta die mapped to more than two physical meta dies. For instance, when a logical meta die is mapped to three physical meta dies, the controller may apply the following example formula to determine the logical meta block address associated with the physical address of the user data block, where LMB is the logical meta block address, N is the number of physical meta dies, L and K are last block IDs which different physical meta dies include, BlockID is the block identifier or physical address of the user data block, and P and Q are different numbers of physical meta dies in redefined groups:

$$LMB = L*N + (K-L)*P + (BlockID-K)*Q + (Q-1).$$

For instance, assume an example case where a logical meta die has 3 physical meta dies (a 1st meta die, a 2nd meta die, and a 3rd meta die), a channel is coupled to three dies (a 1st die belongs to 1st meta die, 2nd die belong to 2nd meta die, and a 3rd die belongs to a 3rd meta die), and that on this channel, the 1st die has 1000 blocks with identifiers/addresses from block #1 to block #1000, the 2nd die has 1300 blocks with identifiers/addresses from block #1 to block #1300, and the 3rd die has 1200 blocks with identifiers/addresses from block #1 to block #1200. Together with other dies in other channel, a total of 3500 logical meta blocks from logical metablock #1 to #3500 may be created. Additionally, assume in this example case that the controller is attempting to identify the logical meta block associated with block ID 1300 in the 2nd die. Accordingly, to identify which logical meta block is associated with block #1300 of the 2nd die of this channel, the controller may determine that from block IDs #1 to 1000, all three physical meta dies have blocks with these IDs on the same channel (i.e. L=1000 and N=3). The controller may also determine that from block IDs #1001 to #1200, only the 2nd and 3rd meta dies have blocks with these IDs on the same channel (i.e. K=1200 and P=2). The controller may further determine that from block IDs #1201 to 1300, only the 2nd meta die has blocks with these IDs in this channel (Q=1). Therefore, the controller may calculate the logical meta block from the aforementioned formula (assuming L=1000, K=1200, blockID=1300, N=3, P=2, and Q=1) to identify LMB #3500.

Figure 16:
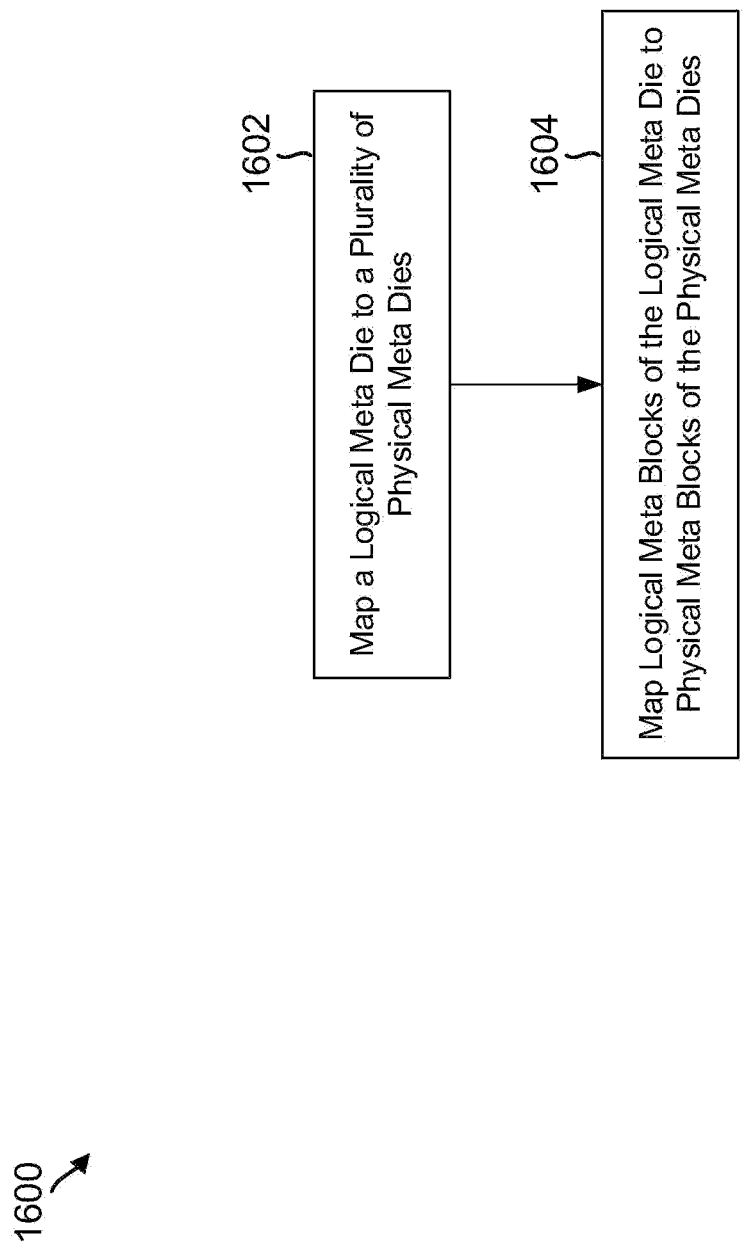
FIG. 16 is a flow chart illustrating a method for mapping a logical meta die to physical meta dies and logical meta blocks of the logical meta die to physical meta blocks of the physical meta dies, as performed by the storage device of FIG. 1.

FIG. 16 illustrates an example flow chart 1600 of a method for mapping a logical meta die including logical meta blocks to multiple physical meta dies each including physical meta blocks. For example, the method can be carried out in a storage device 102 such as the one illustrated in FIG. 1. Each of the steps in the flow chart can be controlled using the controller as described below (e.g. controller 123), by a component or module of the controller, or by some other suitable means.

As represented by block 1602, a memory of the storage device may include a first plurality of dies grouped in a first physical meta die and a second plurality of dies grouped in a second physical meta die, and the controller may map a logical meta die to the first physical meta die and to the second physical meta die. For instance, referring to FIGS. 1, 6-8, and 11-13, a memory 602 (e.g., NVM 110) of storage device 102 may include a first plurality of dies (e.g., dies 610, 1106, 1214, 1306) grouped in a first physical meta die (e.g., physical meta die 1104, 1210, 1308, physical meta die 0 or physical meta die m) and a second plurality of dies (e.g., dies 610, 1106, 1214, 1306) grouped in a second physical meta die (e.g., physical meta die 1104, 1210, 1308, physical meta die 1 or physical meta die m+1). The controller 123, 606, 1202 may map a logical meta die (e.g., logical meta die 1102, 1206, 1302, logical meta die n) to the first physical meta die and to the second physical meta die. For instance, referring to FIG. 7, the controller may associate logical meta die n with both physical meta dies m and m+1 in mapping table 706.

In one example, the first plurality of dies may comprise a first die (e.g., die 0 in FIG. 11) and a second die (e.g., die 8 in FIG. 11), and the second plurality of dies may comprise a third die (e.g., die 32 in FIG. 11) and a fourth die (e.g., die 40 in FIG. 11). The first die may include a first plurality of blocks (e.g., blocks 612, user data blocks in FIG. 11, physical blocks 1304), and the second die may include a second plurality of blocks (e.g., blocks 612, user data blocks in FIG. 11, physical blocks 1304), where a number of the first plurality of blocks (e.g., 1000 user data blocks in die 0) is smaller than a number of the second plurality of blocks (e.g., 1100 user data blocks in die 8). The third die may also include a third plurality of blocks (e.g., blocks 612, user data blocks in FIG. 11, physical blocks 1304) and the fourth die may include a fourth plurality of blocks (e.g., blocks 612, user data blocks in FIG. 11, physical blocks 1304), where a number of the third plurality of blocks (e.g., 1100 user data blocks in die 32) is larger than a number of the fourth plurality of blocks (e.g., 1000 user data blocks in die 40). Moreover, a sum of the number of the first plurality of blocks and the number of the third plurality of blocks (e.g., 2100=1000+1100 user data blocks between dies 0 and 32) is equal to a sum of the number of the second plurality of blocks and the number of the fourth plurality of blocks (e.g., 2100=1100+1000 user data blocks between dies 8 and 40).

When reading and writing data in the logical meta die, the controller may read and write data in only one of the first physical meta die or the second physical meta die at a time. For instance, referring to FIG. 7, if the logical meta die n is mapped to physical meta dies m and m+1 as described above, and if the controller receives a command to read or write data in logical meta die n, the controller may simultaneously read or write data in either physical meta die m or physical meta die m+1 (but not both). For example, referring to the illustrated example of FIG. 7, if the controller receives a command to read or write data in logical dies 0-3, the controller may either read or write data in physical dies 0, 8, 16, 24 at the same time or in physical dies 32, 40, 48, and 56 at the same time, but not in both sets of physical dies at the same time.

As represented by block 1604, the memory may include a plurality of physical meta dies each including a plurality of physical meta blocks, and the controller may map logical meta blocks of the logical meta die to the physical meta blocks. For example, the controller may map a first logical meta block of the logical meta die to a first physical meta block of the first physical meta die, and a second logical meta block of the logical meta die to a second physical meta block of the second physical meta die. A number of the logical meta blocks may be the same as a number of the physical meta blocks. For instance, referring to FIGS. 1, 6-8, and 11-13, the memory 602 (e.g., NVM 110) may include a plurality of physical meta dies (e.g., physical meta dies 1104, 1210, 1308) each including a plurality of physical meta blocks (e.g., physical meta blocks 1212), and controller 123, 606, 1202 may map logical meta blocks 1208 of the logical meta die (e.g., logical meta die 1102, 1206, 1302) to the physical meta blocks 1212. For instance, referring to FIGS. 12 and 13, the controller may map logical meta block 0 of logical meta die 1302 to one of the physical meta blocks 1212 in physical meta die 0, and the controller may map logical meta block 1 of logical meta die 1302 to one of the physical meta blocks 1212 in physical meta die 1. For example, referring to FIGS. 7 and 8, the controller may associate logical meta block x in logical meta die n with physical meta block y in physical meta die m in mapping tables 704, 706, 804, 806, and the controller may associate logical meta block x+1 in logical meta die n with physical meta block y+1 in physical meta die m+1 in mapping tables 704, 706, 804, 806. Thus, the number of logical meta blocks may be equal to the number of physical meta blocks (e.g., each logical meta block may be associated with a different physical meta block in mapping table 806).

In one example, the controller may associate a first one of the logical meta blocks (e.g., logical meta block x) with a first one of the physical meta dies (e.g., physical meta die m) and associate a second one of the logical meta blocks (e.g., logical meta block x+1) with a second one of the physical meta dies (e.g., physical meta die m+1). For instance, referring to FIGS. 7 and 8, the controller may associate logical meta block x with physical meta die m, and similarly associate logical meta block x+1 with physical meta die m+1, by creating one or more mapping entries in one or more of the mapping tables 702, 704, 706, 802, 804, 806 linking the logical meta blocks to corresponding physical meta blocks in the respective physical meta dies. In another example, the controller may map a first one of the logical meta blocks (e.g., logical meta block x) to a first plurality of blocks (e.g., blocks 612, user data blocks in FIG. 11, physical blocks 1304) in a first one of the physical meta dies (e.g., physical meta die m) and map a second one of the logical meta blocks (e.g., logical meta block x+1) to a second plurality of blocks (e.g., blocks 612, user data blocks in FIG. 11, physical blocks 1304) in a second one of the physical meta dies (e.g., physical meta die m+1). For instance, referring to FIGS. 7 and 8, the controller may associate logical meta block x with the blocks in a physical meta block of physical meta die m, and similarly associate logical meta block x+1 with the blocks in a physical meta block of physical meta die m+1, by creating one or more mapping entries in one or more of the mapping tables 702, 704, 706, 802, 804, 806 linking the logical meta blocks to corresponding blocks of physical meta blocks in the respective physical meta dies.

In one example, the controller may associate one or more of the logical meta blocks with one of the physical meta dies, and subsequently determine that a die in the one of the physical meta dies lacks capacity for association of additional logical meta blocks. For instance, referring to FIGS. 12, 13, and 14, as described for example at block 1406, after associating logical meta block 0 of logical meta die 1302 with physical meta die 0, the controller 1202 may determine that one of the dies 1306 in physical meta die 0 lacks available physical blocks 1310 for further meta block mapping. Therefore, the controller may associate another one or more of the logical meta blocks with another one of the physical meta dies in response to determining that the die lacks the capacity for the association of the additional logical meta blocks. For instance, referring to FIGS. 12, 13, and 14, as described for example at block 1410, the controller 1202 may associate logical meta block 2 of logical meta die 1302 with physical meta die 1 (e.g., via block 1312 of corresponding die 1314) in response to determining the lack of available physical blocks 1310 in the aforementioned die. In another example, the controller may associate one of the logical meta blocks with one of the physical meta dies in response to determining that one of the dies in another one of the physical meta dies lacks capacity for association of additional logical meta blocks. For instance, referring to FIGS. 12, 13, and 14, as described for example at blocks 1406 and 1410, the controller 1202 may associate logical meta block 2 of logical meta die 1302 with physical meta die 1 in response to determining that one of the dies 1306 in physical meta die 0 lacks available physical blocks 1310 for associating with logical meta block 2.

Additionally, the controller may identify one of the logical meta blocks from a physical block in one of the physical meta dies, for example, as described above with respect to FIG. 15. In one example, a number of physical blocks of a die in the one of the physical meta dies may be less than or equal to a number of physical blocks of another die in another one of the physical meta dies. For instance, as described above with respect to FIGS. 11, 12, and 15, if the physical block in question is in die 0, the controller 1202 may determine that a number of user data blocks (e.g., 1000 blocks) of die 0 in one of the physical meta dies 1104 is less than or equal to a number of user data blocks (e.g., 1100 blocks) of die 32 in another one of the physical meta dies 1104. In such case, the controller may identify the logical meta block 1208 associated with that user data block as described above with respect to block 1506 (e.g., from one or more of the mapping tables 702, 704, 706, 802, 804, 806). In another example, a number of physical blocks of a die in the one of the physical meta dies may be greater than a number of physical blocks of another die in another one of the physical meta dies, and the controller may regroup the one of the physical meta dies prior to identifying the one of the logical meta blocks. For instance, as described above with respect to FIGS. 11, 12, and 15, if the physical block in question is in die 32, the controller 1202 may determine that a number of user data blocks (e.g., 1100 blocks) of die 32 in one of the physical meta dies 1104 is greater than a number of user data blocks (e.g., 1000 blocks) of die 0 in another one of the physical meta dies 1104. In such case, the controller may regroup the physical meta die prior to identifying the logical meta block 1208 associated with that user data block, as described above with respect to block 1508. As an example, when regrouping the one of the physical meta dies, the controller may remove the physical block from the one of the physical meta dies (e.g., by removing die 32 from the existing physical meta die 1104) and add the physical block to an additional one of the physical meta dies (e.g., by associating die 32 including the block with a new physical meta die mapped to logical meta die 1102).

FIG. 17 is a conceptual diagram illustrating an example 1700 of a controller 1702 coupled to a memory 1704 in a storage device. For example, controller 1702 may correspond to controller 123, 606, 902, 1202, and memory 1704 may correspond to memory 602 or the NVM 110 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

The controller 1702 may include a mapping module 1706 that may provide a means for mapping a logical meta die to the first physical meta die and to the second physical meta die. For example, the mapping module 1706 may perform any of the aforementioned processes described in FIG. 14, 15, or 16. In one configuration, the mapping module may be configured to map logical meta blocks of a logical meta die to physical meta blocks of a plurality of physical meta dies, e.g., as described in connection with 1604. In one configuration, the mapping module may be configured to associate a first logical meta block of a logical meta die to a first one of the physical meta dies and to associate a second logical meta block of the logical meta die to a second one of the physical meta dies.

In a $1^{st}$ example, the memory includes a plurality of physical meta dies, where each physical meta die includes a plurality of dies, where each of the dies in a same one of the physical meta dies is coupled to a different channel, and where two or more of the dies in the same one of the physical meta dies include a different number of blocks; and the controller is configured to map a logical meta die to the physical meta dies, where a total number of blocks in the dies coupled to one of the channels is the same as a total number of blocks in the dies coupled to another one of the channels. For example, referring to the aforementioned Figures, memory 602 (e.g., NVM 110) may include physical meta dies 1104, 1210, 1308, where each physical meta die includes dies 610, 1106, 1214, 1306, where each of the dies in a same one of the physical meta dies is coupled to a different channel (e.g., dies 0, 8, 16, and 24 in FIG. 11 are each coupled to a different channel 608, and similarly dies 32, 40, 48 and 56 in FIG. 11 are each coupled to a different channel 608), and where two or more of the dies in the same one of the physical meta dies include a different number of blocks (e.g., dies 0 and 8 in FIG. 11 include different numbers of user data blocks, such as 1000 and 1100 blocks respectively). The controller 123, 606, 1202, maps logical meta die 1102, 1206, 1302 to the physical meta dies (e.g., as described above with respect to FIG. 7), where a total number of blocks in the dies coupled to one of the channels is the same as a total number of blocks in the dies coupled to another one of the channels (e.g., dies 0 and 32 in FIG. 11 are coupled to a same channel 608 and respectively include 1000 and 1100 user data blocks, dies 8 and 40 are coupled to a same channel and respectively include 1100 and 1000 user data blocks, and the total number of user data blocks in dies 0 and 32 [2100 blocks] is the same as the total number of user data blocks in dies 8 and 40 [2100 blocks]).

In a $2^{nd}$ example, the controller is further configured, when reading and writing data in the logical meta die, to read and write the data in only one of the physical meta dies at a time. For example, referring to the aforementioned Figures, when reading and writing data 119 in logical meta die 1102, 1206, 1302, controller 123, 606, 1202 reads and writes data 119 in only one of the physical meta dies 1104, 1210, 1308 at a time.

In a $3^{rd}$ example, the controller is further configured to map an $i^{th}$ logical meta block of the logical meta die to a $j^{th}$ physical meta block in a $(((i-1) \bmod n)+1)^{th}$ one of the physical meta dies, where n is a number of the physical meta dies, where i=j=1 initially, where i is incremented by 1 after each mapping, and where j is incremented by 1 when ((i−1) mod n)=0. This mapping may be illustrated, for instance, by logical-to-physical meta block mappings 1, 2, 3, and 4 in the example of FIG. 12, where logical meta blocks 1208 are mapped to physical meta blocks 1212 in alternating physical meta dies 1210. For example, referring to the aforementioned Figures where n=2, controller 123, 606, 1202 initially maps a first logical meta block (i=1) to a first physical meta block 1212 (j=1) in a first physical meta die ((((i−1) mod n)+1)=0 mod 2+1=1). This corresponds to mapping '1' in FIG. 12. Next, controller increments i and maps a second logical meta block (i=2) to a first physical meta block 1212 (j=1) in a second physical meta die ((((i−1) mod n)+1)=1 mod 2+1=2). This corresponds to mapping '2' in FIG. 12. Afterwards, controller increments i, resulting in ((i−1) mod n)=0, and thus controller increments j. Next, controller maps a third logical meta block (i=3) to a second physical meta block (j=2) in the first physical meta die ((((i−1) mod n)+1)=2 mod 2+1=1). This corresponds to mapping '3' in FIG. 12. Then, controller increments i and maps a fourth logical meta block (I=4) to the second physical meta block in the second physical meta die ((((i−1) mod n)+1)=3 mod 2+1=2). This corresponds to mapping '4' in FIG. 12. The controller may proceed to map the rest of the logical meta blocks to physical meta blocks in alternating fashion such as described above. While the aforementioned example refers specifically to cases a single logical meta die is mapped to two physical meta dies (n=2), the aforementioned formula may similarly apply in cases where more than two physical meta dies are mapped to a single logical meta die (e.g., n>2).

In a 4$^{th}$ example, the controller is configured, in response to determining that one of the dies in the (((i−1) mod n)+1)$^{th}$ one of the physical meta dies lacks available blocks to map to the i$^{th}$ logical meta block, to map the i$^{th}$ logical meta block to a block in another one of the dies coupled to a same channel as the one of the dies lacking the available blocks. For instance, referring to FIGS. 12 and 13, as the controller 1202 is mapping logical meta blocks to physical meta blocks such as described immediately above, the controller 1202 may determine that die 1306 in physical meta die 0 lacks available blocks 1310 to map to logical meta block 2. In response to this determination, the controller may map logical meta block 2 to block 1312 in die 1314 of physical meta die 1, as dies, 1306, 1314 are coupled to the same channel. For instance, die 1306 may correspond to die 0 and die 1314 may correspond to die 1314 in FIG. 11.

In a 5$^{th}$ example, the controller is further configured to identify a logical meta block of the logical meta die from a block in one of the physical meta dies, where the logical meta block is identified based on a block identifier of the block. For instance, referring to FIGS. 11-13, the controller 1202 may identify logical meta block 0 from a user data block in die 0 having block ID 1, since logical meta block 0 is associated with the 1st user data block of die 0 as illustrated by mapping '1' in FIG. 12. Similarly, the controller may identify logical meta block 3 from a user data block in die 32 having block ID 2, since logical meta block 3 is associated with the 2$^{nd}$ user data block of die 32 as illustrated by mapping '3' in FIG. 12. Various examples (e.g., formulas) of how the controller may perform such identification are described above with respect to FIG. 15.

In a 6$^{th}$ example, the memory includes a plurality of physical meta dies each including a plurality of physical meta blocks; and the controller is configured to map logical meta blocks of a logical meta die to the physical meta blocks, where one of the logical meta blocks is associated with blocks in two or more of the physical meta dies. For instance, referring to the aforementioned Figures, memory 602 (e.g., NVM 110) includes physical meta dies 1104, 1210, 1308 each including physical meta blocks 1212, and controller 123, 606, 1202 maps logical meta blocks 1208 of logical meta die 1102, 1206, 1302 to the physical meta blocks (e.g., as described above with respect to FIG. 8), where one of the logical meta blocks is associated with blocks in two or more of the physical meta dies (e.g., logical meta block 2 in FIG. 13 is associated with blocks 1304, 1312 in both physical meta dies 0 and 1).

In a 7$^{th}$ example, the controller is further configured, when reading and writing data in the logical meta blocks, to read and write the data in only one of the physical meta dies at a time. For example, referring to the aforementioned Figures, when reading and writing data 119 in logical meta blocks 1208, controller 123, 606, 1202 reads and writes data 119 in only one of the physical meta dies 1104, 1210, 1308 at a time.

In a 8$^{th}$ example, the controller is further configured to map an i$^{th}$ logical meta block of the logical meta die to a j$^{th}$ physical meta block in a (((i−1) mod n)+1)$^{th}$ one of the physical meta dies, where n is a number of the physical meta dies, where i=j=1 initially, where i is incremented by 1 in response to each mapping, where j is incremented by 1 in response to ((i−1) mod n)=0. Details of this mapping are described above, for instance, with respect to the 3$^{rd}$ example and the aforementioned Figures.

In a 9$^{th}$ example, the controller is configured to associate the one of the logical meta blocks with blocks in the two or more of the physical meta dies in response to determining that one of the dies in the (((i−1) mod n)+1)$^{th}$ one of the physical meta dies lacks available blocks to map to the i$^{th}$ logical meta block. Details of this association are described above, for instance, with respect to the 4$^{th}$ example and the aforementioned Figures.

In a 10$^{th}$ example, the one of the logical meta blocks is associated with one of the blocks in another one of the dies coupled to a same channel as the one of the dies lacking the available blocks. Details of this association are described above, for instance, with respect to the 4$^{th}$ example and the aforementioned Figures.

In a 11$^{th}$ example, the controller is further configured to identify the one of the logical meta blocks of the logical meta die from a block in one of the physical meta dies, wherein the logical meta block is identified based on a block identifier of the block in a group of the physical meta dies. Details of this identification are described above, for instance, with respect to the 5$^{th}$ example and the aforementioned Figures including FIG. 15. For example, assuming dies 0 and 32 in FIG. 11 each include block identifiers 1-1000 (e.g., each die includes at least 1000 user data blocks), the controller 1202 may identify any one of logical meta blocks 1-2000 from a corresponding block ID in a group of physical meta dies including physical meta dies 1104.

In a 12$^{th}$ example, the memory includes a plurality of physical meta dies each having a plurality of dies, where each of the physical meta dies includes a plurality of physical meta blocks, and where each of the dies is coupled to a channel and includes a plurality of blocks. The controller is configured to map a logical meta die to the physical meta dies, to map logical meta blocks of the logical meta die to the physical meta blocks, where a first one of the logical meta blocks is associated with one of the physical meta dies and a second one of the logical meta blocks is associated with two or more of the physical meta dies, and to identify the first one of the logical meta blocks from a first one of the blocks and the second one of the logical meta blocks from a second one of the blocks. For instance, referring to the aforementioned Figures, memory 602 (e.g., NVM) includes physical meta dies 1104, 1210, 1308 each having dies 1106, 1214, 1306, where each of the physical meta dies includes physical meta blocks 1212, and where each of the dies is coupled to a channel 608 and includes blocks 916, 1304. The controller 123, 606, 1202 maps a logical meta die 1102, 1206, 1302 to physical meta dies 1104, 1210, 1308 (e.g., as described above with respect to FIG. 7), maps logical meta blocks 1208 of the logical meta die to physical meta blocks 1212 (e.g., as described above with respect to FIG. 8). A first one of the logical meta blocks 1208 is associated with one of the physical meta dies (e.g., referring to FIG. 13, logical meta block 0 is associated only with physical meta die 0, logical meta block 1 is associated only with physical meta die 1, etc.), and a second one of the logical meta blocks is associated with two or more of the physical meta dies (e.g., referring to FIG. 13, logical meta block 2 is associated with both physical meta dies 0 and 1). The controller also identifies the first one of the logical meta blocks (e.g., logical meta block 0 in FIG. 13) from a first one of the blocks (e.g., block 1304) and the second one of the logical meta blocks from a second one of the blocks (e.g., block 1312), such as described above with respect to the $5^{th}$ and $11^{th}$ examples and FIG. 15.

In a $13^{th}$ example, the controller is configured to identify the first one of the logical meta blocks based on a block identifier of the first one of the blocks in a first group of the physical meta dies, and to identify the second one of the logical meta blocks based on a block identifier of the second one of the blocks in a second group of the physical meta dies, the second group being different than the first group. For example, referring to FIGS. 11-13 and as described above with respect to FIG. 15, the controller 1202 may identify logical meta block 1000 from a user data block having block ID 500 in die 32 of a first group of physical meta dies including physical meta dies 0 and 1, while the controller may identify logical meta block 2003 from a user data block having block ID 1003 in die 32 of a second group of physical meta dies only including physical meta die 1.

In a $14^{th}$ example, each of the physical meta dies in the first group include a die coupled to a same channel, and the controller is configured to identify the first one of the logical meta blocks from the first one of the blocks in response to determining that each of the dies coupled to the same channel include a block associated with a same block identifier as the first one of the blocks. For example, referring to the $13^{th}$ example as well as FIGS. 11-13, and as described above with respect to FIG. 15, dies 0 and 32 in physical meta dies 0 and 1 (the first group of physical meta dies) are each coupled to the same channel 608, and the controller 1202 may identify logical meta block 1000 from the user data block having block ID 500 in die 32 in response to determining that dies 0 and 32 each include a user data block having block ID 500. For example, the controller may apply the first formula described above with respect to FIG. 15 (or another formula) to calculate the logical meta block in response to the determination.

In a $15^{th}$ example, each of the physical meta dies include a die coupled to a same channel, and the controller is configured to identify the second one of the logical meta blocks from the second one of the blocks in response to determining that one of the dies coupled to the same channel lacks a block associated with the block identifier of the second one of the blocks. For example, referring to the $13^{th}$ example as well as FIGS. 11-13, and as described above with respect to FIG. 15, dies 0 and 32 in physical meta dies 0 and 1 are each coupled to the same channel 608, and the controller 1202 may identify logical meta block 2003 from the user data block having block ID 1003 in die 32 in response to determining that die 0 lacks a user data block having block ID 1003 (since die 0 only includes 1000 user data blocks while die 32 includes 1100 user data blocks in this example). For example, the controller may apply the second formula described above with respect to FIG. 15 (or another formula) to calculate the logical meta block in response to the determination.

In a $16^{th}$ example, the second group includes a smaller number of physical meta dies than the first group. For example, referring to the $13^{th}$, $14^{th}$, and $15^{th}$ examples, the second group of physical meta dies (e.g., physical meta die 1) is smaller than the first group of physical meta dies (e.g., physical meta dies 0 and 1).

In a $17^{th}$ example, the controller is further configured to map an $i^{th}$ logical meta block of the logical meta die to a $j^{th}$ physical meta block in a $(((i-1) \bmod n)+1)^{th}$ one of the physical meta dies, wherein n is a number of the physical meta dies, wherein i=j=1 initially, wherein i is incremented by 1 following each mapping, and wherein j is incremented by 1 when $((i-1) \bmod n)=0$. Details of this mapping are described above, for instance, with respect to the $3^{rd}$ and $8^{th}$ examples and the aforementioned Figures.

In a $18^{th}$ example, the controller is further configured, when reading and writing data in the logical meta die, to read and write the data in only one of the physical meta dies at a time. For example, referring to the aforementioned Figures, when reading and writing data 119 in the logical meta die 1102, 1206, 1302, controller 123, 606, 1202 reads and writes data 119 in only one of the physical meta dies 1104, 1210, 1308 at a time.

In a $19^{th}$ example, two or more of the dies in a same one of the physical meta dies include a different number of blocks. For instance, as described above with respect to the $1^{st}$ example and the aforementioned Figures, dies 0 and 8 in the same physical meta die of FIG. 11 may include different numbers of user data blocks, such as 1000 and 1100 blocks respectively.

In a $20^{th}$ example, a total number of blocks in the dies coupled to one of the channels is the same as a total number of blocks in the dies coupled to another one of the channels. For instance, as described above with respect to the $19^{th}$ example and the aforementioned Figures, dies 0 and 32 in FIG. 11 are coupled to a same channel 608 and respectively include 1000 and 1100 user data blocks, dies 8 and 40 are coupled to a same channel and respectively include 1100 and 1000 user data blocks, and the total number of user data blocks in dies 0 and 32 (2100 blocks) is the same as the total number of user data blocks in dies 8 and 40 (2100 blocks).

Accordingly, the controller described in the present disclosure reduces firmware complexity in managing logical and physical meta dies and meta blocks when new dies and blocks are added to the storage device to increase storage capacity. For example, rather than mapping a single logical meta die to a single physical meta die according to a one-to-one mapping, the controller may map a single logical meta die to multiple physical meta dies according to a one-to-many mapping. In this way, the yield rate of the storage device may also improve.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a memory including a plurality of physical dies; and
   a controller configured to:
   form a plurality of physical meta dies respectively including multiple ones of the physical dies, wherein each of the physical dies in a same one of the physical meta dies is coupled to a different channel, and
   map a logical meta die to the plurality of physical meta dies, wherein a first physical die coupled to one of the channels in one of the physical meta dies includes a different number of physical user data blocks than a second physical die coupled to a same one of the channels in another one of the physical meta dies, and the first physical die in the one of the physical meta dies includes a different number of physical user data blocks than a third physical die in the one of the physical meta dies,
   wherein the logical meta die is mapped to the plurality of physical meta dies in response to a total number of physical user data blocks in the physical dies coupled to the one of the channels being the same as a total number of physical user data blocks in the physical dies coupled to another one of the channels.

2. The storage device of claim 1, wherein the controller is further configured, when reading and writing data in the logical meta die, to read and write the data in only one of the physical meta dies at a time.

3. The storage device of claim 1, wherein the controller is further configured to map an $i^{th}$ logical meta block of the logical meta die to a $j^{th}$ physical meta block in a $(((i-1) \bmod n)+1)^{th}$ one of the physical meta dies, wherein n is a number of the physical meta dies, wherein $i=j=1$ initially, wherein i is incremented by 1 after each mapping, and wherein j is incremented by 1 when $((i-1) \bmod n)=0$.

4. The storage device of claim 3, wherein the controller is configured, in response to determining that one of the physical dies in the $(((i-1) \bmod n)+1)^{th}$ one of the physical meta dies lacks available physical blocks to map to the $i^{th}$ logical meta block, to map the $i^{th}$ logical meta block to a physical block in another one of the physical dies coupled to a same channel as the one of the physical dies lacking the available physical blocks.

5. The storage device of claim 1, wherein the controller is further configured to identify a logical meta block of the logical meta die from a physical block in one of the physical meta dies, wherein the logical meta block is identified based on a block identifier of the physical block.

6. A storage device, comprising:
   a memory including a plurality of physical dies; and
   a controller configured to:
   form a plurality of physical meta dies respectively including multiple ones of the physical dies, wherein each of the physical meta dies includes a plurality of physical meta blocks, and each of the physical dies in a same one of the physical meta dies is coupled to a different channel, and
   map logical meta blocks of a logical meta die respectively to the physical meta blocks of the plurality of physical meta dies, wherein one of the logical meta blocks is associated with physical blocks in two or more of the physical meta dies, one of the physical dies coupled to one of the channels in one of the physical meta dies includes a different number of physical user data blocks than another physical die coupled to a same one of the channels in another one of the physical meta dies, and the one of the physical dies in the one of the physical meta dies includes a different number of physical user data blocks than an additional physical die in the one of the physical meta dies.

7. The storage device of claim 6, wherein the controller is further configured, when reading and writing data in the logical meta blocks, to read and write the data in only one of the physical meta dies at a time.

8. The storage device of claim 6, wherein the controller is further configured to map an $i^{th}$ logical meta block of the logical meta die to a $j^{th}$ physical meta block in a $(((i-1) \bmod n)+1)^{th}$ one of the physical meta dies, wherein n is a number of the physical meta dies, wherein $i=j=1$ initially, wherein i is incremented by 1 in response to each mapping, wherein j is incremented by 1 in response to $((i-1) \bmod n)=0$.

9. The storage device of claim 8, wherein the controller is configured to associate the one of the logical meta blocks with physical blocks in the two or more of the physical meta dies in response to determining that one of the physical dies in the $(((i-1) \bmod n)+1)^{th}$ one of the physical meta dies lacks available physical blocks to map to the $i^{th}$ logical meta block.

10. The storage device of claim 9, wherein the one of the logical meta blocks is associated with one of the physical blocks in another one of the physical dies coupled to a same channel as the one of the physical dies lacking the available physical blocks.

11. The storage device of claim 6, wherein the controller is further configured to identify the one of the logical meta blocks of the logical meta die from a physical block in the one of the physical meta dies, wherein the logical meta block is identified based on a block identifier of the physical block in a group of the physical meta dies.

12. A storage device, comprising:
    a memory including a plurality of physical dies, wherein each of the physical dies includes a plurality of physical blocks; and
    a controller configured to:
    form a plurality of physical meta dies respectively including multiple ones of the physical dies, wherein each of the physical dies in a respective physical meta die is coupled to a different channel, and wherein each of the physical meta dies includes a plurality of physical meta blocks,
    map a logical meta die to the plurality of physical meta dies, wherein one of the physical dies coupled to one of the channels in one of the physical meta dies includes a different number of physical user data blocks than another physical die coupled to a same one of the channels in another one of the physical meta dies, and the one of the physical dies in the one of the physical meta dies includes a different number of physical user data blocks than an additional physical die in the one of the physical meta dies,
    map logical meta blocks of the logical meta die to the physical meta blocks, wherein a first one of the logical meta blocks is associated with only one of the physical meta dies and a second one of the logical meta blocks is associated with two or more of the physical meta dies, and
    identify the first one of the logical meta blocks from a first one of the physical blocks and the second one of the logical meta blocks from a second one of the physical blocks.

13. The storage device of claim 12, wherein the controller is configured to identify the first one of the logical meta blocks based on a block identifier of the first one of the physical blocks in a first group of the physical meta dies, and to identify the second one of the logical meta blocks based on a block identifier of the second one of the physical blocks in a second group of the physical meta dies, the second group being different than the first group.

14. The storage device of claim 13, wherein each of the physical meta dies in the first group include a physical die coupled to a same channel, and wherein the controller is configured to identify the first one of the logical meta blocks from the first one of the physical blocks in response to determining that each of the physical dies coupled to the same channel include a physical block associated with a same block identifier as the first one of the physical blocks.

15. The storage device of claim 13, wherein each of the physical meta dies include a physical die coupled to a same channel, and wherein the controller is configured to identify the second one of the logical meta blocks from the second one of the physical blocks in response to determining that one of the physical dies coupled to the same channel lacks a physical block associated with the block identifier of the second one of the physical blocks.

16. The storage device of claim 13, wherein the second group includes a smaller number of physical meta dies than the first group.

17. The storage device of claim 12, wherein the controller is further configured to map an $i^{th}$ logical meta block of the logical meta die to a $j^{th}$ physical meta block in a $(((i-1) \bmod n)+1)^{th}$ one of the physical meta dies, wherein n is a number of the physical meta dies, wherein i=j=1 initially, wherein i is incremented by 1 following each mapping, and wherein j is incremented by 1 when $((i-1) \bmod n)=0$.

18. The storage device of claim 12, wherein the controller is further configured, when reading and writing data in the logical meta die, to read and write the data in only one of the physical meta dies at a time.

19. The storage device of claim 12, wherein a first physical die in a same one of the physical meta dies includes a different number of physical blocks than a second physical die in the same one of the physical meta dies.

20. The storage device of claim 19, wherein a total number of physical blocks in the physical dies coupled to one of the channels is the same as a total number of physical blocks in the physical dies coupled to another one of the physical channels.

* * * * *